US011848701B2

United States Patent
Imai et al.

(10) Patent No.: US 11,848,701 B2
(45) Date of Patent: Dec. 19, 2023

(54) OPTICAL SPACE COMMUNICATION SYSTEM AND OPTICAL SPACE COMMUNICATION METHOD

(71) Applicant: Nippon Telegraph and Telephone Corporation, Tokyo (JP)

(72) Inventors: Takeshi Imai, Musashino (JP); Kota Asaka, Musashino (JP); Takuya Kanai, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 56 days.

(21) Appl. No.: 17/623,967

(22) PCT Filed: Jul. 1, 2019

(86) PCT No.: PCT/JP2019/026098
§ 371 (c)(1),
(2) Date: Dec. 30, 2021

(87) PCT Pub. No.: WO2021/001885
PCT Pub. Date: Jan. 7, 2021

(65) Prior Publication Data
US 2022/0368417 A1 Nov. 17, 2022

(51) Int. Cl.
*H04B 10/114* (2013.01)
(52) U.S. Cl.
CPC .................. *H04B 10/114* (2013.01)
(58) Field of Classification Search
None
See application file for complete search history.

(56) References Cited

U.S. PATENT DOCUMENTS 6,535,314 B1 * 3/2003 Mendenhall ......... H04B 10/118
398/121
7,274,877 B1 * 9/2007 Britz .................. H04B 10/1125
398/55

(Continued)

FOREIGN PATENT DOCUMENTS

JP    H09331295    12/1997
JP    2007184706    7/2007

(Continued)

OTHER PUBLICATIONS

Furuki, "Optical Communication Technology Handbook," The Optronics Co., Ltd., Jan. 30, 2002, pp. 24-26, 9 pages (with English Translation).

*Primary Examiner* — Jai M Lee
(74) *Attorney, Agent, or Firm* — Fish & Richardson P.C.

(57) ABSTRACT

A station-side telescope included in a station-side optical antenna unit is configured to transmit and receive an optical signal, a guide light source is configured to emit guide light in a direction of orientation of the station-side telescope, a node-side telescope is configured to transmit and receive an optical signal, a node-side control unit included in a node-side optical antenna unit is configured to generate and output a control signal for moving a node-side base based on a position of the guide light included in an image obtained by a camera capturing the guide light emitted by the guide light source so that a direction of orientation of the node-side telescope faces the direction of orientation of the station-side telescope, an antenna drive unit is configured to receive the control signal and generate and output a drive signal based on the control signal, and the node-side base included in the node-side optical antenna unit is configured to support the node-side telescope and receive the drive signal to change a direction of orientation of the node-side telescope.

7 Claims, 18 Drawing Sheets

(56) References Cited

U.S. PATENT DOCUMENTS

| | | | | |
|---|---|---|---|---|
| 7,609,972 | B2* | 10/2009 | Cunningham | H04B 10/1127 |
| | | | | 398/118 |
| 8,295,706 | B2* | 10/2012 | Cunningham | H04B 10/112 |
| | | | | 398/131 |
| 9,077,449 | B2* | 7/2015 | Coleman | H04B 10/118 |
| 9,825,701 | B2* | 11/2017 | Juarez | H04B 10/112 |
| 10,917,173 | B2* | 2/2021 | Kingsbury | H04B 7/18513 |
| 11,005,565 | B1* | 5/2021 | Mitchell | H04B 10/1123 |
| 11,375,146 | B2* | 6/2022 | Schultz | H04N 25/583 |
| 2016/0094290 | A1 | 3/2016 | Nishino et al. | |
| 2021/0036777 | A1* | 2/2021 | Ben Moshe | G01S 3/7867 |

FOREIGN PATENT DOCUMENTS

| | | |
|---|---|---|
| JP | 2009-10444 | 1/2009 |
| WO | WO 2014181871 | 11/2014 |

\* cited by examiner

OPTICAL SPACE COMMUNICATION SYSTEM AND OPTICAL SPACE COMMUNICATION METHOD

CROSS-REFERENCE TO RELATED APPLICATIONS

This application is a National Stage application under 35 U.S.C. § 371 of International Application No. PCT/JP2019/026098, having an International Filing Date of Jul. 1, 2019, the disclosure of which is considered part of the disclosure of this application, and is incorporated in its entirety into this application.

TECHNICAL FIELD

The present invention relates to an optical space communication system and an optical space communication method.

BACKGROUND ART

Space communication in which radio waves or light beams are directly transmitted without using wires such as copper wires or optical fibers as a signal medium allow installation locations of terminal stations to be freely moved. Furthermore, work for constructing transmission paths can be reduced.

Techniques for such space communication include one in which a semiconductor laser is used as a light source to form a light beam with a lens and the like and uses the light beam as an optical signal. This technique makes signal interception by a third party difficult and brings excellent communication confidentiality because it shows high straightness of optical signals as compared to a technique in which radio waves or light from light emitting diodes (LEDs) are used as signals (e.g., see Non Patent Literature 1).

Furthermore, with respect to acceleration of a signal transmission speed, a technique of applying high-speed signal modulation to a semiconductor laser has already been used in the field of optical fiber communication, for example, and is also easily applied to optical space communication systems.

CITATION LIST

Non Patent Literature

Non Patent Literature 1: Tetsuya Miki, Shoichi Sudo, "Handbook of Optical Communication Technology" published by The Optronics Co., Ltd., Jan. 30, 2002, pp. 24-26

SUMMARY OF THE INVENTION

Technical Problem

However, when a semiconductor laser is used as a light source to form a light beam of an optical signal using a lens or the like, unless light beams are accurately oriented, the reception side suffers significant loss in light intensity due to straightness of the light beams. As a result, there is a problem that the direction of orientation of the light beams needs to be adjusted each time the terminal station is installed or moved, which hinders free movement of the terminal station or reduction in construction work that are advantages of space communication.

In view of the above-described circumstances, the present invention aims to provide a technique capable of easily adjusting a direction of orientation of a light beam of an optical signal in an appropriate direction.

Means for Solving the Problem

An aspect of the present invention is an optical space communication system including a station device including a station-side optical antenna unit, and a node device including a node-side optical antenna unit and a camera, the optical space communication system being configured to perform optical space communication between the station device and the node device, in which the station-side optical antenna unit includes a station-side telescope configured to transmit and receive an optical signal, and
a guide light source configured to emit guide light in a direction of orientation of the station-side telescope,
and the node-side optical antenna unit includes a node-side telescope configured to transmit and receive the optical signal, a node-side control unit configured to generate and output a control signal for moving a node-side base based on a position of the guide light included in an image obtained by the camera capturing the guide light emitted by the guide light source so that a direction of orientation of the node-side telescope faces the direction of orientation of the station-side telescope, an antenna drive unit configured to receive the control signal and generate and output a drive signal based on the control signal, and the node-side base configured to support the node-side telescope and receive the drive signal to change the direction of orientation of the node-side telescope.

An aspect of the present invention is the optical space communication system in which the node-side optical antenna unit includes a directional camera configured to capture an image in the direction of orientation of the node-side telescope, and the node-side control unit generates and outputs the control signal for moving the node-side base based on a position of the guide light included in the image captured by the directional camera so that the direction of orientation of the node-side telescope faces the direction of orientation of the station-side telescope.

An aspect of the present invention is the optical space communication system in which there are a plurality of the station devices, the node device includes a plurality of the node-side telescopes, a plurality of the node-side bases corresponding to the plurality of the node-side telescopes, and a plurality of the antenna drive units corresponding to the plurality of the node-side bases, the node-side control unit allocates, based on a position of an individual beam of a plurality of beams of the guide light included in the image obtained by the camera capturing the plurality of beams of the guide light emitted by the guide light sources of the plurality of the station devices, any one of the plurality of the node-side telescopes that is performing neither transmission nor reception of the optical signal to one of the station-side telescopes corresponding to the individual beam of the plurality of beams of the guide light, and generates and outputs the control signal for moving one of the plurality of the node-side bases supporting the allocated node-side telescope so that the allocated node-side telescope faces the station-side telescope corresponding to the node-side telescope.

An aspect of the present invention is the optical space communication system in which the node-side control unit outputs the control signal for adjusting the direction of orientation of the node-side telescope based on a light intensity value indicating an intensity of light received by the node-side telescope so that the direction of orientation of the node-side telescope faces the direction of orientation of the station-side telescope, or the station device includes a station-side base configured to support the station-side telescope and receive an operation signal to change the direction of orientation of the station-side telescope, and a station-side control unit configured to output the operation signal for adjusting the direction of orientation of the station-side telescope based on a light intensity value indicating an intensity of light received by the station-side telescope so that the direction of orientation of the node-side telescope faces the direction of orientation of the station-side telescope.

An aspect of the present invention is the optical space communication system in which, when the node-side control unit adjusts the direction of orientation of the node-side telescope, the node-side control unit outputs the control signal for adjusting the direction of orientation of the node-side telescope by changing the orientation of the node-side telescope, an emission position of light within the node-side telescope or a position of a lens included in the node-side telescope, or when the station-side control unit adjusts the direction of orientation of the station-side telescope, the station-side control unit outputs the operation signal for adjusting the direction of orientation of the station-side telescope by changing the orientation of the station-side telescope, an emission position of light within the station-side telescope or a position of a lens included in the station-side telescope.

An aspect of the present invention is the optical space communication system in which, when the node-side control unit adjusts the direction of orientation of the node-side telescope, the light received by the node-side telescope includes signal light and additional guide light, and the node-side control unit outputs the control signal for adjusting the direction of orientation of the node-side telescope based on the light intensity value of the additional guide light so that the direction of orientation of the node-side telescope faces the direction of orientation of the station-side telescope, or when the station-side control unit adjusts the direction of orientation of the station-side telescope, the light received by the station-side telescope includes the signal light and the additional guide light, and the station-side control unit outputs the operation signal for adjusting the direction of orientation of the station-side telescope based on the light intensity value of the additional guide light so that the direction of orientation of the node-side telescope faces the direction of orientation of the station-side telescope.

An aspect of the present invention is the optical space communication system in which the node device diffuses or converges a beam of the optical signal emitted by the node-side telescope, or the station device diffuses or converges a beam of the optical signal emitted by the station-side telescope.

An aspect of the present invention is an optical space communication method including a station device including a station-side optical antenna unit; and a node device including a node-side optical antenna unit and a camera, the optical space communication method being for performing optical space communication between the station device and the node device, the optical space communication method including:

by a station-side telescope included in the station-side optical antenna unit, transmitting and receiving an optical signal, by a guide light source included in the station-side optical antenna unit, emitting guide light in a direction of orientation of the station-side telescope, by a node-side telescope included in the node-side optical antenna unit, transmitting and receiving an optical signal, by a node-side control unit included in the node-side optical antenna unit, generating and outputting a control signal for moving a node-side base based on a position of the guide light included in an image obtained by the camera capturing the guide light emitted by the guide light source so that a direction of orientation of the node-side telescope faces the direction of orientation of the station-side telescope, by an antenna drive unit, receiving the control signal and generating and outputting a drive signal based on the control signal, and by the node-side base included in the node-side optical antenna unit, supporting the node-side telescope and receiving the drive signal to change the direction of orientation of the node-side telescope.

Effects of the Invention

According to the present invention, a direction of orientation of a light beam of an optical signal can be easily adjusted in an appropriate direction.

DESCRIPTION OF EMBODIMENTS

First Embodiment

Figure 1:
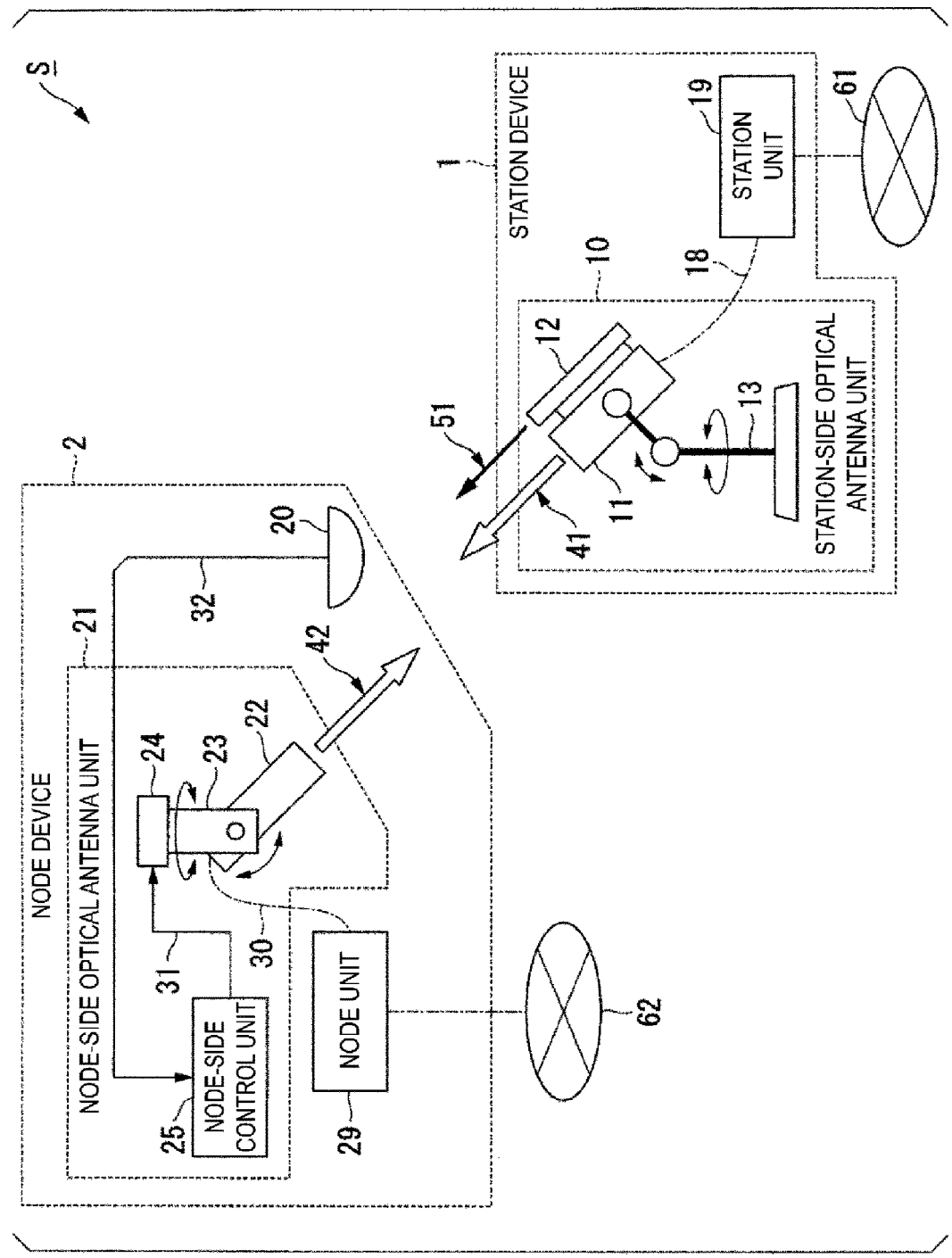
FIG. 1 is a block diagram illustrating a configuration of an optical space communication system according to a first embodiment.

An embodiment of the present invention will be described below with reference to the drawings. FIG. 1 is a block diagram illustrating a configuration of an optical space communication system S according to a first embodiment. The solid connection lines in FIG. 1 indicate wiring for transmitting and receiving control information such as control signals, drive signals, image data, and the like. The dot-and-dash connection lines in FIG. 1 indicate wiring for transmitting signal information such as electrical signals and optical signals including information transmitted and received between a terminal device and a server device in optical space communication. The same applies to the wiring types illustrated in FIGS. 3, 5, and 8 to 10 below.

The optical space communication system S includes a station device 1 and a node device 2. The station device 1 is connected to a station-side communication network 61. The station-side communication network 61 is, for example, a local area network (LAN) to which a terminal device, or the like is connected, or the like. The node device 2 is connected to a node-side communication network 62. The node-side communication network 62 is, for example, the Internet to which a server device or the like is connected, or the like.

The station device 1 includes a station-side optical antenna unit 10 and a station unit 19. The station-side optical antenna unit 10 and the station unit 19 are connected by an optical fiber 18.

The station unit 19 receives an electrical transmission signal transmitted by a terminal device connected to the station-side communication network 61, for example. The station unit 19 converts the received electrical transmission signal into an optical signal and outputs the converted optical signal to the station-side optical antenna unit 10 via the optical fiber 18.

The station unit 19 receives an optical signal output by the station-side optical antenna unit 10 via the optical fiber 18. The station unit 19 converts the received optical signal into an electrical signal and transmits the converted electrical signal to a destination terminal device via the station-side communication network 61.

The station-side optical antenna unit 10 includes a station-side telescope 11, a guide light source 12, and a station-side base 13.

The station-side telescope 11 is connected to the station unit 19 via the optical fiber 18. The station-side telescope 11 shapes an optical signal emitted by the optical fiber 18 into a light beam 41 using a lens or the like provided inside and emits the light beam to a space. The light beam 41 obtained from the shaping has a beam diameter that is appropriate for a node-side telescope 22 of the opposing node device 2 to receive light.

In addition, the station-side telescope 11 receives a light beam 42 emitted by a node-side optical antenna unit 21 of the opposing node device 2, condenses the received light beam 42, and makes the light beam incident to the optical fiber 18.

The guide light source 12 is fixed to the station-side telescope 11 having an opening disposed closest to an opening of a lens barrel of the station-side telescope 11 that emits the light beam 41. The guide light source 12 emits guide light 51 which is continuous light having a light intensity and a light wavelength to a degree at which the position of a bright spot of the guide light source 12 can be clearly identified in an image captured by a camera 20 included in the node device 2. The guide light source 12 emits the guide light 51 in a direction parallel to the optical axis of the station-side telescope 11 and in the direction of orientation of the station-side telescope 11.

The station-side base 13 supports the station-side telescope 11 and adjusts the station-side telescope 11 in any direction. The station-side base 13 is movable, e.g., by a person's hand so that the station-side telescope 11 can be oriented in any direction.

The node device 2 includes the camera 20, the node-side optical antenna unit 21, and a node unit 29. The camera 20 and the node-side optical antenna unit 21 are connected by image transmitting wiring 32. The node-side optical antenna unit 21 and the node unit 29 are connected by an optical fiber 30.

The node unit 29 receives an optical signal output by the node-side optical antenna unit 21 via the optical fiber 30. The node unit 29 converts the received optical signal into an electrical signal and transmits the converted electrical signal to a destination server device via the node-side communication network 62.

The node unit 29 receives an electrical transmission signal transmitted by a server device connected to the node-side communication network 62. The node unit 29 converts the received electrical transmission signal into an optical signal and outputs the converted optical signal to the node-side optical antenna unit 21 via the optical fiber 30.

The camera 20 has a sufficient field of view to capture a range in which the node-side optical antenna unit 21 performs optical space communication and sufficient resolution and light sensitivity to detect the guide light 51 emitted by the guide light source 12. The camera 20 is disposed in the vicinity of the node-side optical antenna unit 21. Here, the vicinity of the node-side optical antenna unit 21 refers to a position at which a minimum range in which the node-side optical antenna unit 21 performs optical space communication can be captured.

The camera 20 outputs data of the captured image to the node-side optical antenna unit 21 via the image transmitting wiring 32. The camera 20 may be any camera as long as it enables the guide light 51 to be detected in a space in which the node-side optical antenna unit 21 performs optical space communication. For example, for the camera 20, a camera with a wide-angle lens or a fisheye lens having a field of view in which a space in which the node-side optical antenna unit 21 performs optical space communication can be overlooked, or the like is applied.

The node-side optical antenna unit 21 includes the node-side telescope 22, a node-side base 23, an antenna drive unit 24, and a node-side control unit 25. The antenna drive unit 24 and the node-side control unit 25 are connected by control wiring 31.

The node-side telescope 22 is connected to the node unit 29 via an optical fiber 30. The node-side telescope 22 receives the light beam 41 emitted by the station-side optical antenna unit 10 of the opposing station device 1. The node-side telescope 22 condenses the received light beam 41 and makes the light beam incident to the optical fiber 30.

The node-side telescope 22 shapes an optical signal emitted by the optical fiber 30 into a light beam 42 using a lens or the like provided inside and emits the light beam to the space. The light beam 42 obtained from the shaping has a beam diameter that is appropriate for the station-side telescope 11 of the opposing station device 1 to receive light.

The node-side base 23 is driven by the antenna drive unit 24. The node-side base 23 accepts a drive signal output by the antenna drive unit 24 and causes the node-side telescope 22 to be oriented in the direction of an angle of turning and an angle of depression/elevation indicated by the accepted drive signal.

The antenna drive unit 24 accepts a control signal output by the node-side control unit 25 via the control wiring 31. The antenna drive unit 24 generates a drive signal for driving the node-side base 23 based on the accepted control signal. The antenna drive unit 24 outputs the generated drive signal to the node-side base 23.

The node-side control unit 25 accepts data of the image output by the camera 20 via the image transmitting wiring 32. The node-side control unit 25 detects the position of a bright spot of the guide light 51 included in the accepted image. The node-side control unit 25 calculates the position of the station-side optical antenna unit 10 from the camera 20 based on the detected position of the bright spot of the guide light 51. In other words, the node-side control unit 25 calculates the relative position of the station-side optical antenna unit 10 to the camera 20. The node-side control unit 25 generates, based on the information of the calculated position, a control signal for causing the direction of orientation of the node-side telescope 22 to face the direction of orientation of the station-side telescope 11. The node-side control unit 25 outputs the generated control signal to the antenna drive unit 24 via the control wiring 31.

Process of Optical Space Communication System of First Embodiment

Figure 2:
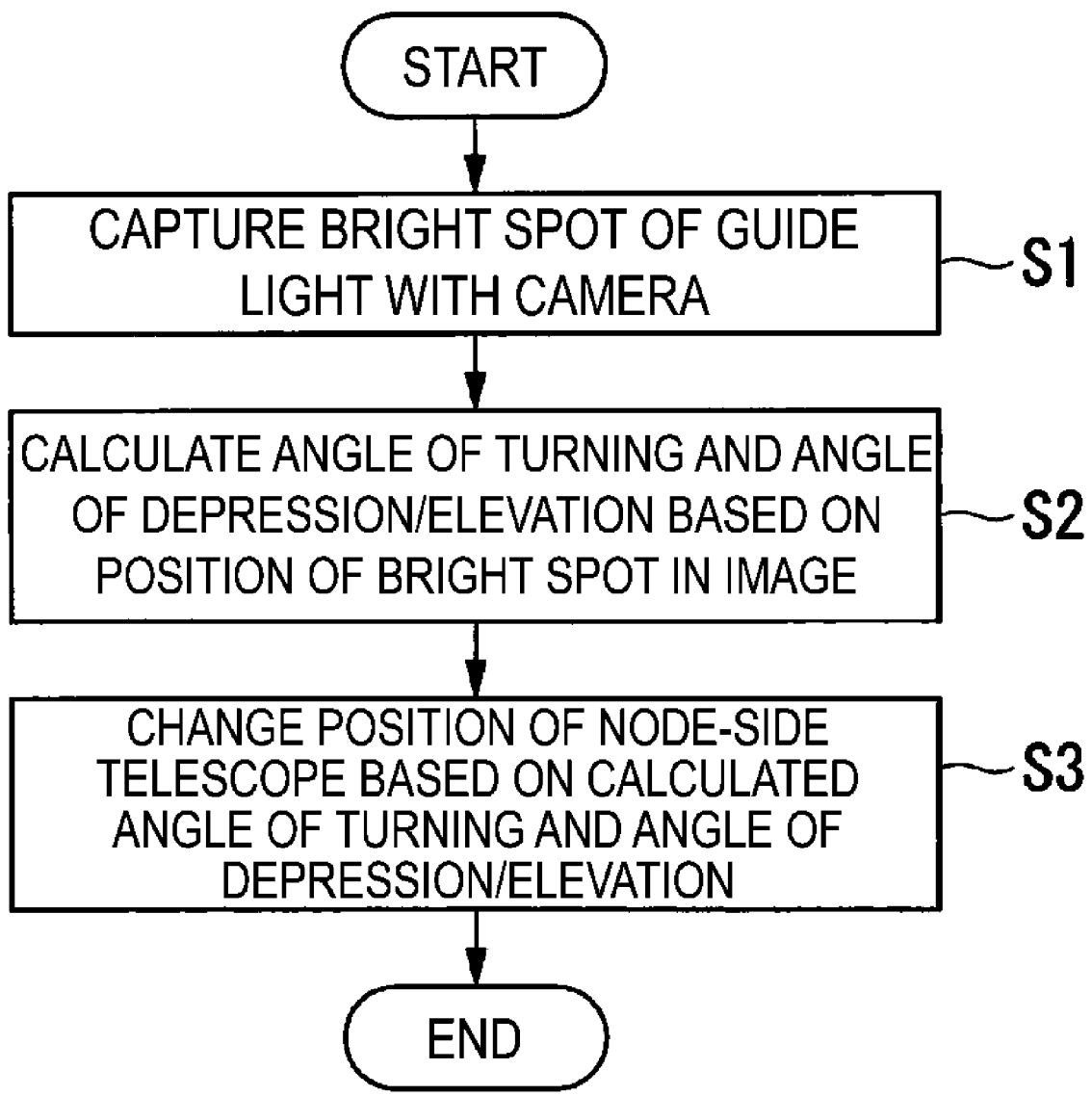
FIG. 2 is a flowchart illustrating a process performed by a node-side optical antenna unit according to the first embodiment.

FIG. 2 is a flowchart illustrating a process performed by the node-side optical antenna unit 21 of the node device 2 according to the first embodiment. It is assumed that there is a need for the station device 1 to perform optical space communication with the node device 2. The station-side base 13 of the station device 1 is moved with, for example, hands of a person to change the orientation of the guide light source 12 so that the node-side telescope 22 is irradiated with the guide light 51.

The camera 20 of the node device 2 captures an image (step S1). As a result, the bright spot of the guide light 51 emitted by the guide light source 12 is recorded in the image. The camera 20 outputs data of the captured image to the node-side control unit 25 via the image transmitting wiring 32.

The node-side control unit 25 accepts the data of the image output by the camera 20 via the image transmitting wiring 32. The node-side control unit 25 detects the bright spot of the guide light 51 included in the accepted image. The node-side control unit 25 detects the bright spot of the guide light 51 and thus determines that a request to start optical space communication from the station device 1 has been made. The node-side control unit 25 detects the position of the bright spot of the guide light 51 included in the accepted image. The node-side control unit 25 calculates the position of the station-side optical antenna unit 10 from the camera 20 based on the detected position. The position of the camera 20 and the position of the node-side telescope 22 are in a known positional relationship. Thus, the node-side control unit 25 calculates the angle of turning and the angle of depression/elevation of the node-side telescope 22 based on the calculated position (step S2).

The node-side control unit 25 outputs a control signal including information of the calculated angle of turning and the angle of depression/elevation to the antenna drive unit 24 via the control wiring 31. The antenna drive unit 24 accepts the control signal output by the node-side control unit 25 via the control wiring 31. The antenna drive unit 24 generates a drive signal based on the accepted control signal, and outputs the generated drive signal to the node-side base 23.

The node-side base 23 receives the drive signal from the antenna drive unit 24 to change the orientation of the node-side telescope 22 to have the angle of turning and the angle of depression/elevation indicated by the drive signal (step S3). That is, the node-side base 23 adjusts the orientation of the node-side telescope 22 to have the angle of turning and the angle of depression/elevation indicated by the drive signal.

As a result, the direction of orientation of the node-side telescope 22 faces the direction of orientation of the station-side telescope 11 coaxially or nearly coaxially.

If the light beam 41 and the light beam 42 have an appropriate beam diameter, the node-side telescope 22 can receive the light beam 41 emitted by the station-side telescope 11. Conversely, if the light beam 41 and the light beam 42 have an appropriately beam diameter, the station-side telescope 11 can receive the light beam 42 emitted by the node-side telescope 22. A light intensity of each of the received light beams 41 and 42 that is sufficient to allow the node unit 29 and the station unit 19 to receive optical signals enables optical space communication.

With the configuration of the first embodiment described above, the optical space communication system S includes the station device 1 including the station-side optical antenna unit 10 and the node device 2 including the node-side optical antenna unit 21 and the camera 20. The station-side telescope 11 transmits and receives optical signals in the station-side optical antenna unit 10. The guide light source 12 emits the guide light 51 in the direction of orientation of the station-side telescope 11. The node-side telescope 22 transmits and receives optical signals in the node-side optical antenna unit 21. The node-side control unit 25 generates and outputs a control signal for moving the node-side base 23 based on the position of the guide light 51 included in the image obtained by the camera 20 capturing the guide light 51 emitted by the guide light source 12 so that the direction of orientation of the node-side telescope 22 faces the direction of orientation of the station-side telescope 11. The antenna drive unit 24 receives the control signal and generates and outputs a drive signal based on the control signal. The node-side base 23 supports the node-side telescope 22 and receives the drive signal to change the direction of orientation of the node-side telescope 22. Consequently, the direction of orientation of the light beam of the optical signal can be easily adjusted in an appropriate direction.

Further, although the guide light 51 is continuous light in the configuration of the first embodiment described above, some modulation may be applied or information of a communication speed at which the node-side control unit 25 can sufficiently perform decoding may be transmitted to facilitate detection by the node-side control unit 25.

In addition, the station-side base 13 of the station-side optical antenna unit 10 may be movable using a power source such as a motor, without relying on the hands of a person.

For the camera 20, rather than a camera equipped with a wide-angle lens or a fisheye lens, a camera that has a narrower field of view than that of a wide-angle lens or a fisheye lens and can scan the space may be applied.

When the node-side control unit 25 calculates the angle of turning and the angle of depression/elevation in the process of step S2, a post or a marker that can serve as a reference may be disposed so as to be reflected in the image captured by the camera 20. This enables the node-side control unit 25 to more accurately calculate the angle of turning and the angle of depression/elevation.

When the camera 20 is disposed, the position in an image captured by the camera 20 may be associated with the angle of turning and the angle of depression/elevation in advance and stored in a storage area in the node-side control unit 25.

Second Embodiment

Figure 3:
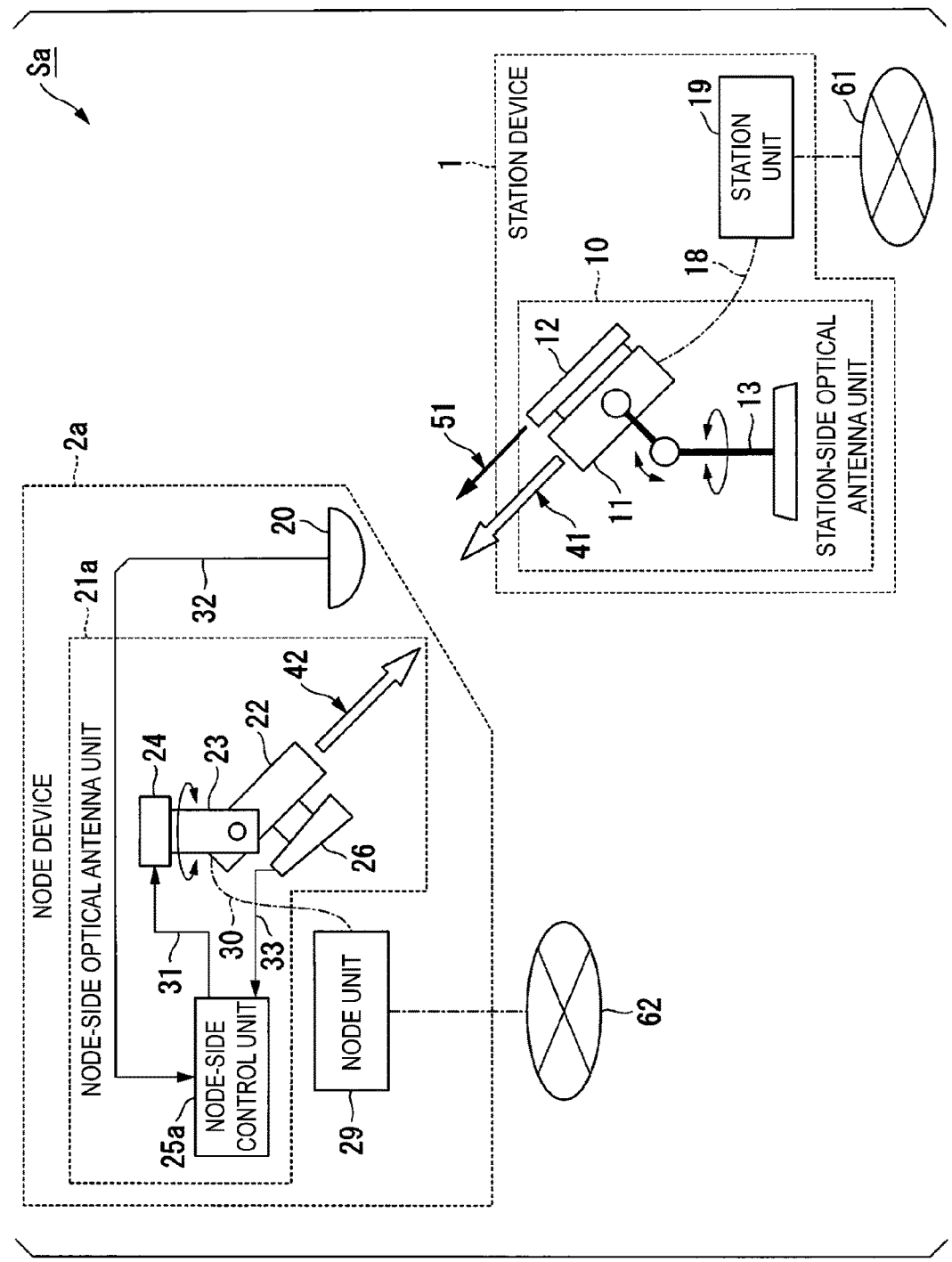
FIG. 3 is a block diagram illustrating a configuration of an optical space communication system according to a second embodiment.

FIG. 3 is a block diagram illustrating a configuration of an optical space communication system Sa according to a second embodiment. The same constituent components as those in the first embodiment are denoted by the same reference numerals, and different constituent components will be described.

The optical space communication system Sa includes a station device 1 and a node device 2a. The node device 2a includes a camera 20, a node-side optical antenna unit 21a, and a node unit 29.

The node-side optical antenna unit 21a includes a node-side telescope 22, a node-side base 23, an antenna drive unit 24, a node-side control unit 25a, and a directional camera 26.

The directional camera 26 is fixed in the immediate proximity of the node-side telescope 22 such that an imaging direction matches a direction of orientation of a light beam 42 emitted by the node-side telescope 22. Here, a state in which an imaging direction of the directional camera 26 matches a direction of orientation of the light beam 42 emitted by the node-side telescope 22 is, in other words, a state in which the imaging direction and the direction of orientation are parallel or nearly parallel.

The directional camera 26 is connected to the node-side control unit 25a via image transmitting wiring 33. The directional camera 26 captures guide light 51 emitted by a guide light source 12. The directional camera 26 outputs data of an image obtained from the capturing to the node-side control unit 25a via the image transmitting wiring 33.

In addition to the configuration of the node-side control unit 25 of the first embodiment, the node-side control unit 25a has the following configuration. Specifically, the node-side control unit 25a accepts the data of the image output by the directional camera 26 via the image transmitting wiring 33. The node-side control unit 25a detects the position of a bright spot of guide light 51 included in the image accepted via the image transmitting wiring 33. The node-side control unit 25a calculates the angle of turning and the angle of depression/elevation such that the detected position of the bright spot is at the center of the image. The node-side control unit 25a outputs a control signal including information of the calculated angle of turning and the angle of depression/elevation to the antenna drive unit 24 via the control wiring 31.

Process of Optical Space Communication System of Second Embodiment

Figure 4:
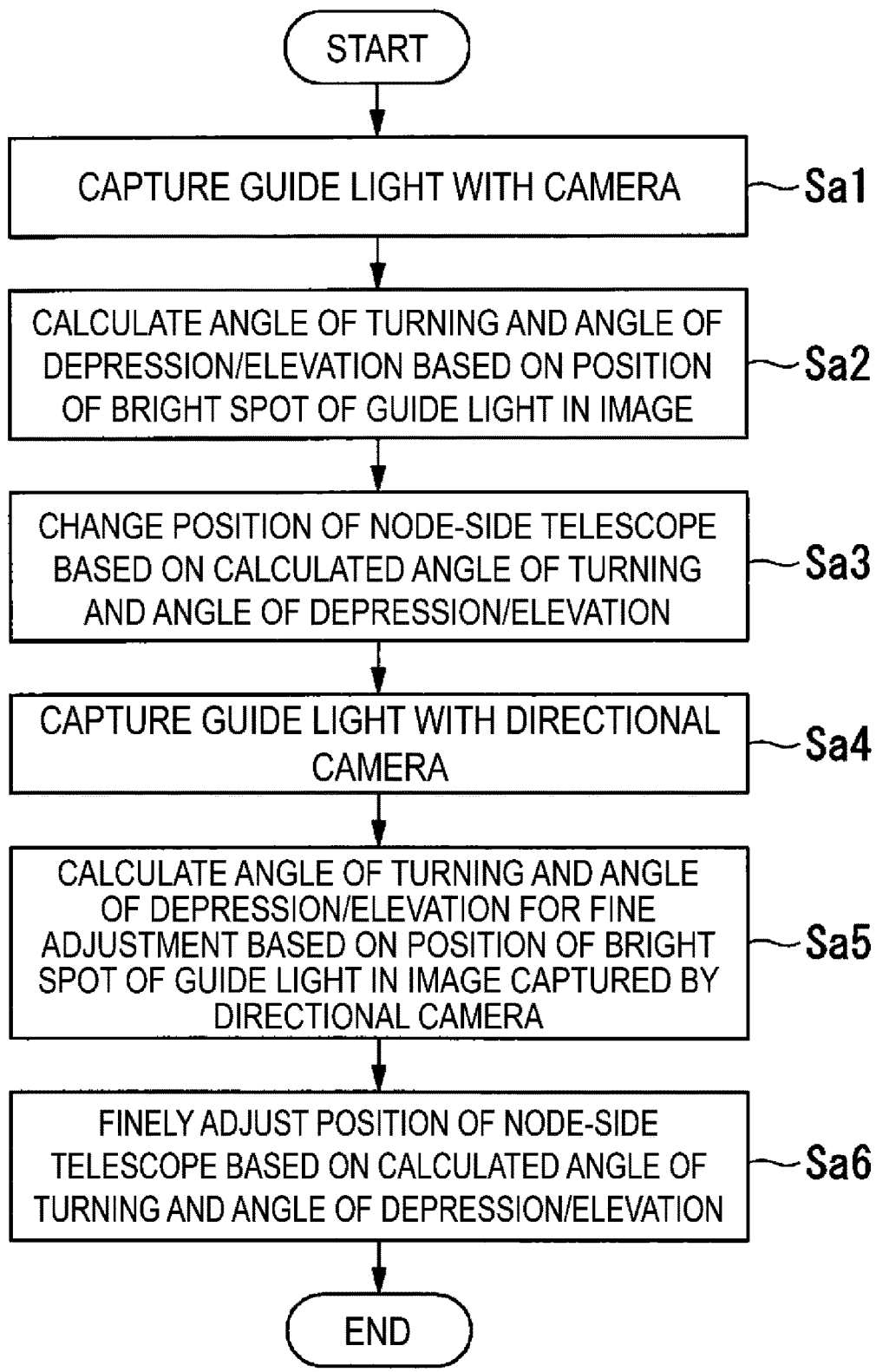
FIG. 4 is a flowchart illustrating a process performed by a node-side optical antenna unit according to the second embodiment.

FIG. 4 is a flowchart illustrating a process performed by the node-side optical antenna unit 21a of the node device 2a according to the second embodiment. The node-side optical antenna unit 21a performs the processes from step Sa1 to step Sa3, similar to step S1 to step S3 in the first embodiment.

At the time point at which step Sa3 ends, the direction of orientation of the station-side telescope 11 faces the direction of orientation of the node-side telescope 22 coaxially or nearly coaxially. In the case in which the directions are nearly coaxial, a light intensity of optical signals received by the station-side telescope 11 and the node-side telescope 22 can be increased through further fine adjustment.

The directional camera 26 performs imaging, and outputs data of an image obtained from the imaging to the node-side control unit 25a via the image transmitting wiring 33 (step Sa4). Because the imaging direction of the directional camera 26 is nearly coaxial with the illumination direction of the guide light source 12, the bright spot of the guide light 51 is included in the image captured by the directional camera 26.

The node-side control unit 25a accepts the data of the image output by the directional camera 26 via the image transmitting wiring 33. The node-side control unit 25a detects the position of the bright spot of the guide light 51 included in the accepted image. The node-side control unit 25a calculates the angle of turning and the angle of depression/elevation for fine adjustment so that the detected position of the bright spot is at the center of the image (step Sa5).

The node-side control unit 25a outputs a control signal including information of the calculated angle of turning and the angle of depression/elevation to the antenna drive unit 24 via the control wiring 31. The antenna drive unit 24 accepts the control signal output by the node-side control unit 25a via the control wiring 31. The antenna drive unit 24 generates a drive signal based on the accepted control signal, and outputs the generated drive signal to the node-side base 23.

The node-side base 23 receives the drive signal from the antenna drive unit 24 to change the orientation of the node-side telescope 22 to have the angle of turning and the angle of depression/elevation indicated by the drive signal and perform fine adjustment (step Sa6).

In the configuration of the second embodiment described above, the node-side optical antenna unit 21a further includes the directional camera 26, and the imaging direction of the directional camera 26 matches the direction of orientation of the node-side telescope 22. The node-side control unit 25a generates and outputs a control signal for moving the node-side base 23 based on the position of the guide light 51 captured by the directional camera 26 so that the direction of orientation of the node-side telescope 22 faces the direction of orientation of the station-side telescope 11.

This makes the direction of orientation of the station-side telescope 11 and the direction of orientation of the node-side telescope 22 more precisely coaxial. Therefore, light intensity of optical signals received by the station-side telescope 11 and the node-side telescope 22 can be increased, which enables more accurate optical signals to be transmitted and/or received.

Further, although the node-side control unit 25*a* calculates the angle of turning and the angle of depression/elevation for fine adjustment so that the position of the detected bright spot is at the center of the image in the configuration of the second embodiment described above, the configuration of the present invention is not limited to the embodiment described above. For example, if a position at which the direction of orientation of the station-side telescope 11 is coaxial with the direction of orientation of the node-side telescope 22 is not at the center of an image, but is nearly at the center of a position shifted from the center of the image to the extent that the parallax between the directional camera 26 and the node-side telescope 22 is considered, the angle of turning and the angle of depression/elevation for fine adjustment may be calculated to adjust the coaxial position to the center.

Third Embodiment

Figure 5:
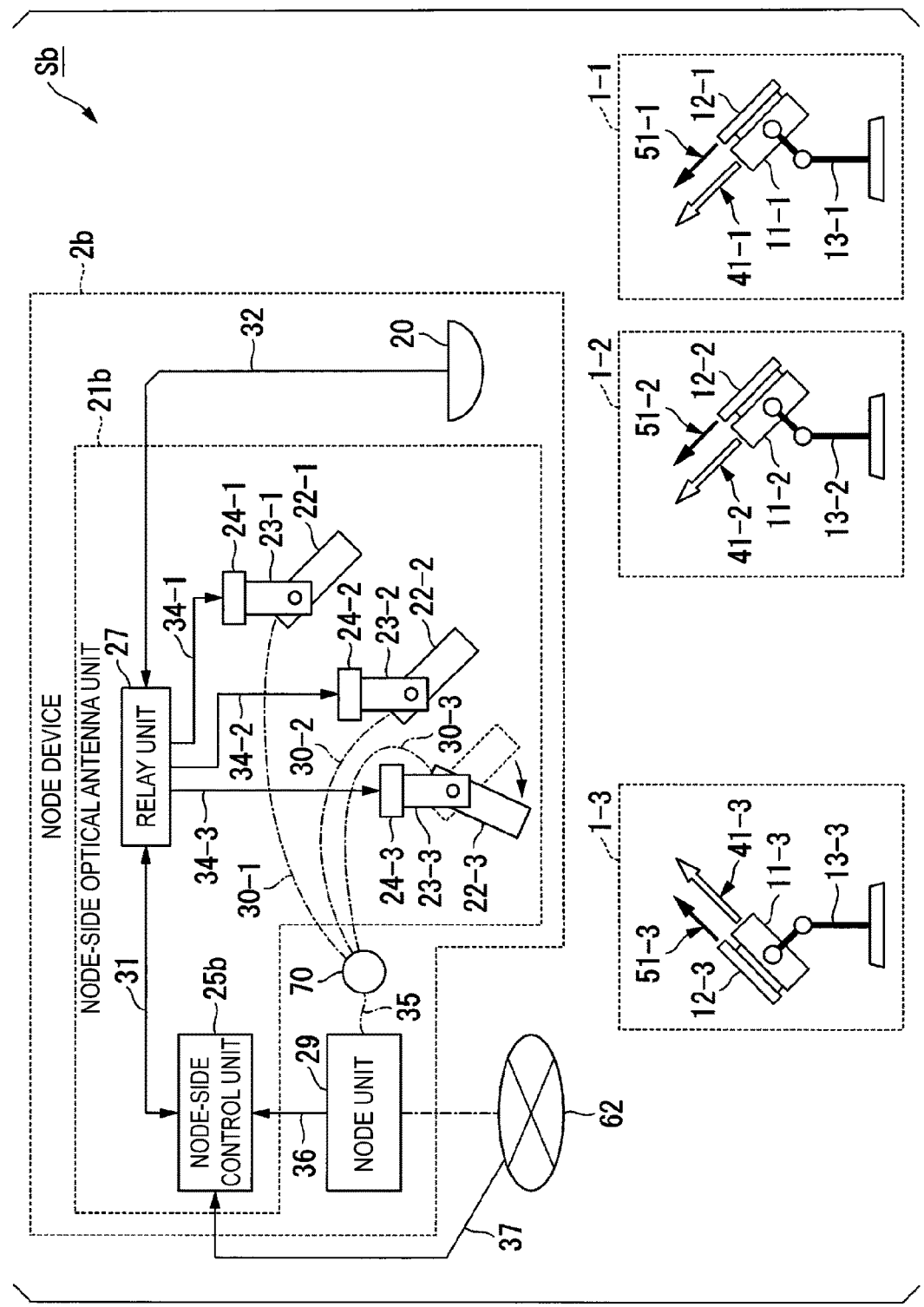
FIG. 5 is a block diagram illustrating a configuration of an optical space communication system according to a third embodiment.

FIG. 5 is a block diagram illustrating a configuration of an optical space communication system Sb according to a third embodiment. The same constituent components as those in the first and second embodiments are denoted by the same reference numerals, and different constituent components will be described below.

Further, in FIG. 5, a configuration corresponding to the optical fiber 18, the station unit 19, and the station-side communication network 61 is omitted for station devices 1-1, 1-2, and 1-3 corresponding to the station device 1 according to the first embodiment. It is assumed that the station devices 1-1, 1-2, and 1-3 actually include optical fibers 18-1, 18-2, and 18-3, and station units 19-1, 19-2, and 19-3, respectively, and the station units 19-1, 19-2, and 19-3 are connected to station-side communication networks 61-1, 61-2, and 61-3, respectively, similar to the station device 1 of the first embodiment.

The optical space communication system Sb includes the three station devices 1-1, 1-2, and 1-3 and a node device 2*b*. The station devices 1-1, 1-2, and 1-3 include the same functional units as those of the station device 1 of the first embodiment. In the following description, in a case in which individual functional units included in the station devices 1-1, 1-2, and 1-3 are to be indicated, a corresponding suffix number is given after the hyphen of the reference numeral of the functional unit like, for example, a station-side telescope 11-1 of the station device 1-1.

The node device 2*b* includes a camera 20, a node-side optical antenna unit 21*b*, a node unit 29, and a light splitter 70.

The light splitter 70 multiplexes optical signals emitted by optical fibers 30-1 to 30-3 and makes the optical signals incident to an optical fiber 35 to which the node unit 29 is connected. The light splitter 70 is an optical multiplexer/demultiplexer and the optical fibers 30-1 to 30-3 and 35 are connected. The light splitter 70 demultiplexes an optical signal emitted by the optical fiber 35 and makes the optical signal incident to the optical fibers 30-1 to 30-3.

The node-side optical antenna unit 21*b* includes three sets of node-side telescopes 22-1, 22-2, and 22-3, node-side bases 23-1, 23-2, and 23-3, and antenna drive units 24-1, 24-2, and 24-3, a relay unit 27, and a node-side control unit 25*b*.

The node-side telescopes 22-1, 22-2, and 22-3 have the same configuration as the node-side telescope 22 of the first embodiment. The node-side bases 23-1, 23-2, and 23-3 also have the same configuration as the node-side base 23 of the first embodiment. The antenna drive units 24-1, 24-2, and 24-3 also have the same configuration as the antenna drive unit 24 of the first embodiment.

First ends of control wiring 31, image transmitting wiring 32, and drive wiring 34-1, 34-2, ad 34-3 are connected to the relay unit 27. A second end of the control wiring 31 is connected to the node-side control unit 25*b*, a second end of the image transmitting wiring 32 is connected to the camera 20, and second ends of the drive wiring 34-1, 34-2, and 34-3 are connected to the antenna drive units 24-1, 24-2, and 24-3, respectively.

The relay unit 27 relays data of an image output by the camera 20 via the image transmitting wiring 32 and outputs the data of the image to the node-side control unit 25*b* via the control wiring 31. In addition, the relay unit 27 relays a control signal output by the node-side control unit 25*b* via the control wiring 31 and outputs the control signal to the antenna drive units 24-1, 24-2, and 24-3 corresponding to the destination of the control signal via the drive wiring 34-1, 34-2, and 34-3.

The node-side control unit 25*b* is connected to the node unit 29 by alignment wiring 36. The node-side control unit 25*b* acquires via the alignment wiring 36, information indicating a usage status of the node unit 29 (hereinafter, referred to as "usage status information") stored by the node unit 29 in an internal storage area. Here, the usage status information is information indicating a communication status of each of the node-side telescopes 22-1, 22-2, and 22-3. For example, the usage status information is information in which a time stamp is associated with information indicating a communication start, a communication end, or a communication interruption.

The node-side control unit 25*b* stores information indicating a history of the node-side telescopes 22-1, 22-2, and 22-3 driven in the internal storage area (hereinafter referred to as "drive history information"). Here, the drive history information is information on a history of the node-side telescopes 22-1, 22-2, and 22-3 driven. For example, the drive history information is information in which time stamps are associated with records of the individual node-side telescopes 22-1, 22-2, and 22-3 driven in response to reception of guide light 51-1, 51-2, and 51-3, and arranged for each of the node-side telescopes 22-1, 22-2, and 22-3.

The node-side control unit 25*b* detects one of the node-side telescopes 22-1, 22-2, and 22-3 in an idle state that is neither transmitting nor receiving an optical signal based on the drive history information and the usage status information acquired from the node unit 29.

The node-side control unit 25*b* accepts the data of the image output by the camera 20 relayed by the relay unit 27. The node-side control unit 25*b* detects the position of a bright spot of the guide light 51-1, 51-2, and 51-3 included in the accepted image. When the bright spot of the new guide light 51-1, 51-2, and 51-3 is detected, the node-side control unit 25*b* allocates any one of the node-side telescopes 22-1, 22-2, and 22-3 in the idle state to one of the station-side telescopes 11-1, 11-2, and 11-3 corresponding to the new guide light 51-1, 51-2, and 51-3. This allocation causes any one of the node-side telescopes 22-1, 22-2, and 22-3 to be associated with any one of the station-side telescopes 11-1, 11-2, and 11-3 in a one-to-one manner.

Note that, for example, the node-side control unit 25*b* determines whether the detected bright spot of the guide light 51-1, 51-2, and 51-3 is a new bright spot. In other words, if a bright spot is detected at a position different from the position at which a bright spot has been detected in the image captured by the camera 20 immediately before, the node-side control unit 25b determines that the bright spot at the different position is a new bright spot.

The node-side control unit 25b detects the positions of the bright spots of the guide light 51-1, 51-2, and 51-3 included in the image captured by the camera 20. Then, the node-side control unit 25b detects the positions of station-side optical antenna units 10-1, 10-2, and 10-3 corresponding to each of the bright spot with reference to the camera 20. Based on information of the detected positions, the node-side control unit 25b generates control signals for causing the direction of orientations of the associated node-side telescopes 22-1, 22-2, and 22-3 to face the direction of orientations of the station-side telescopes 11-1, 11-2, and 11-3. When the control signals are generated, the node-side control unit 25b generates the control signals by including information destined for the antenna drive units 24-1, 24-2, and 24-3 corresponding to the target node-side telescopes 22-1, 22-2, and 22-3 in the control signals. The node-side control unit 25b outputs the generated control signals to the antenna drive units 24-1, 24-2, and 24-3 corresponding to the destinations of the control signals via the control wiring 31 and the relay unit 27.

Further, although the three station devices 1-1, 1-2, and 1-3 are illustrated in FIG. 5, the number is not limited to three, and may be any number equal to or greater than two. In addition, although the three sets of the node-side telescopes 22-1, 22-2, and 22-3, the node-side bases 23-1, 23-2, and 23-3, and the antenna drive units 24-1, 24-2, and 24-3 are illustrated in the node-side optical antenna unit 21b, the number may be any number equal to or greater than two.

Process of Optical Space Communication System of Third Embodiment

Next, processes by the node-side optical antenna unit 21b of the node device 2b of a third embodiment will be described with reference to FIGS. 6 and 7. Here, it is assumed that the optical space communication system Sb includes four station devices 1-1, 1-2, 1-3, and 1-4, and four sets of node-side telescopes 22-1, 22-2, 22-3, and 22-4, node-side bases 23-1, 23-2, 23-3, and 23-4, and antenna drive units 24-1, 24-2, 24-3, and 24-4.

As a precondition, a light intensity of guide light 51-1, 51-2, 51-3, and 51-4 emitted by guide light sources 12-1, 12-2, 12-3, and 12-4 included in the station devices 1-1, 1-2, 1-3, and 1-4 should be set in advance to a level at which a camera 20 can simultaneously detect four bright spots of the light and the imaging device of the camera 20 is not saturated with the light even in simultaneous illumination. By setting the light intensity in advance, even if the camera 20 captures the guide light 51-1, 51-2, 51-3, and 51-4 emitted by the plurality of guide light sources 12-1, 12-2, 12-3, and 12-4, the bright spots of the guide light 51-1, 51-2, 51-3, and 51-4 are clearly recorded in the captured image.

In addition, it is assumed that the station devices 1-1, 1-2, 1-3, and 1-4 are disposed to be separated in advance to the extent that the bright spots of the guide light 51-1, 51-2, 51-3, and 51-4 can be separated and distinguished with the resolution of the camera 20. With the precondition, the node-side control unit 25b can accurately detect the positions of the bright spots of the guide light 51-1, 51-2, 51-3, and 51-4 from the image captured by the camera 20.

Figure 6:
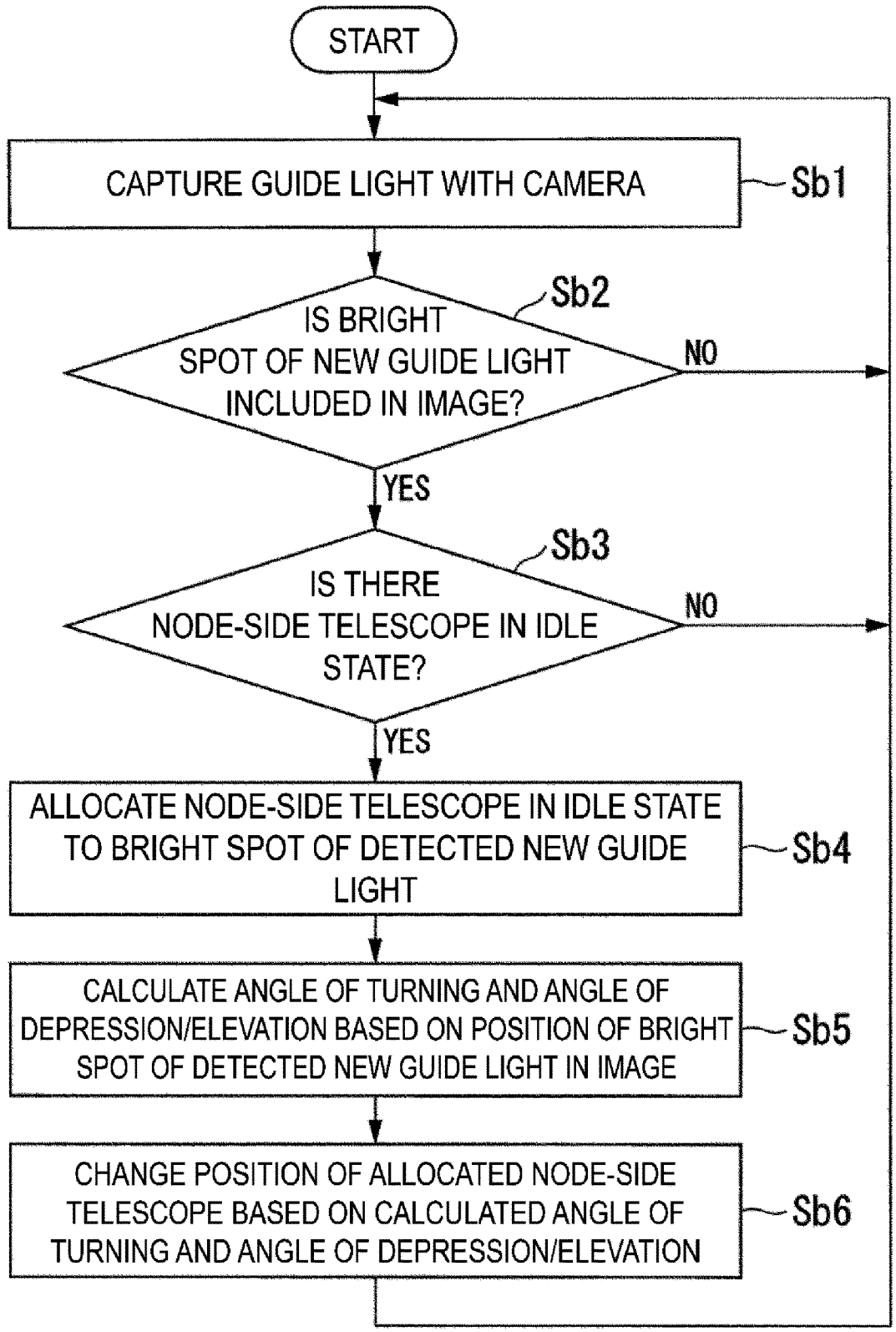
FIG. 6 is a flowchart illustrating a process performed by a node-side optical antenna unit according to the third embodiment.
Figure 7:
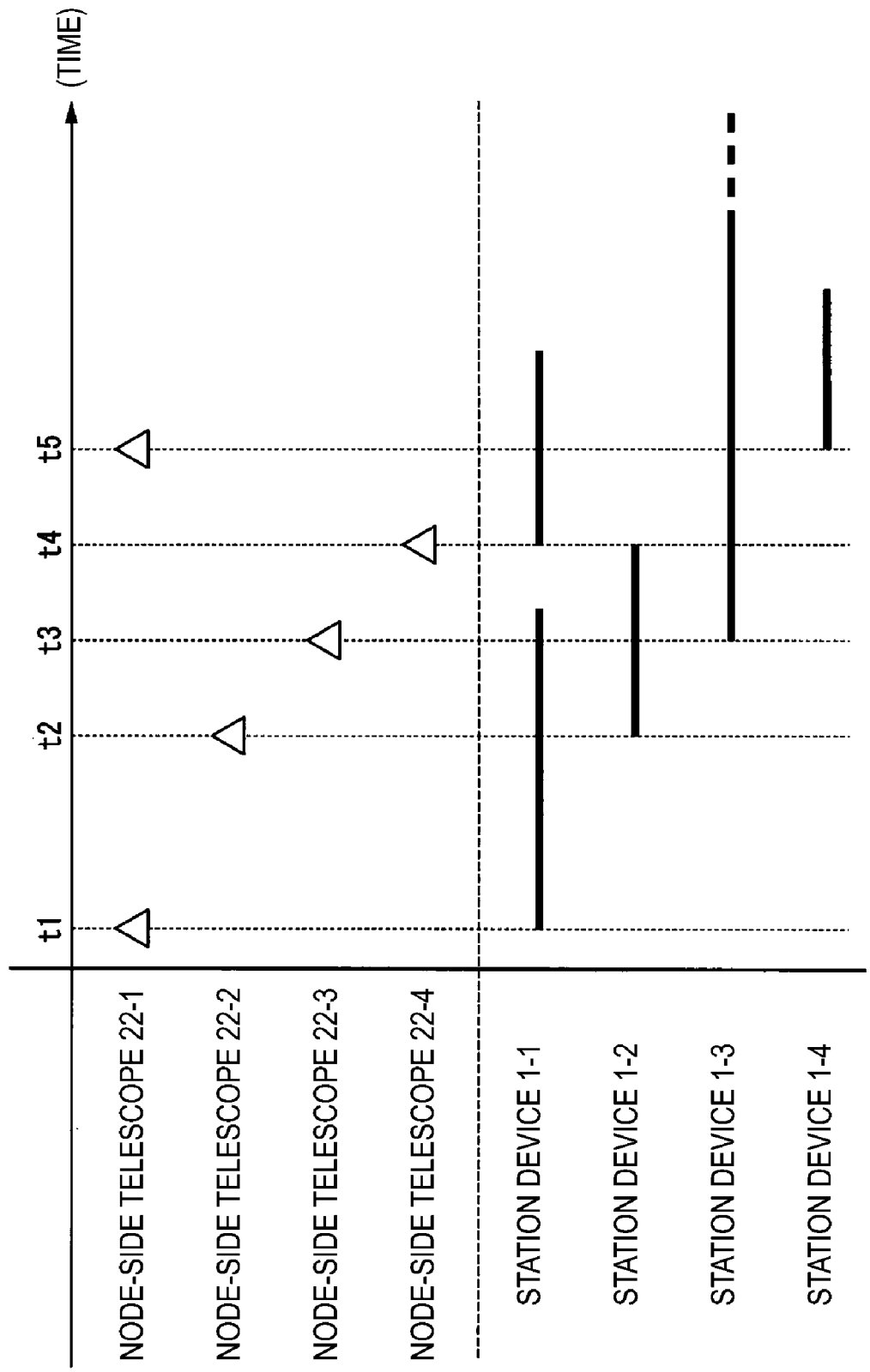
FIG. 7 is a timing chart illustrating the time elapsed in a process performed by node-side control unit according to the third embodiment.

FIG. 6 is a flowchart illustrating a process performed by the node-side optical antenna unit 21b of the node device 2b according to the third embodiment. In addition, FIG. 7 is a timing chart illustrating the time elapsed in a process by the node-side control unit 25b, illustrating an allocation status of the four node-side telescopes 22-1 to 22-4 and a communication status of the four station devices 1-1, 1-2, 1-3, and 1-4. Further, in the timing chart of FIG. 7, the horizontal axis is a time axis, and the mark "▲" indicates the time at which the node-side telescopes 22-1 to 22-4 start driving and corresponds to the drive history information described above.

The line segments corresponding to the station devices 1-1, 1-2, 1-3, and 1-4 indicate a state from a communication start to a communication end and corresponds to the usage status information described above.

At time t1, it is assumed that there is a need for optical space communication between the node device 2b and the station device 1-1. The station-side base 13-1 of the station device 1-1 is moved, e.g., by hands, to change the orientation of the guide light source 12-1 so that the guide light source 12-1 of the station device 1-1 emits the guide light 51-1 in the direction of the node-side telescopes 22-1 to 22-4.

The camera 20 of the node device 2b captures an image (step Sb1). As a result, the bright spot of the guide light 51-1 emitted by the guide light source 12-1 is recorded in the image. The camera 20 outputs data of the captured image to the node-side control unit 25b via the image transmitting wiring 32 and the relay unit 27.

The node-side control unit 25b accepts the data of the image output by the camera 20 via the control wiring 31. The node-side control unit 25b determines whether the accepted image includes a bright spot of the new guide light 51-1 (step Sb2). If the node-side control unit 25b determines that the accepted image does not include a bright spot of the new guide light 51-1 (NO in step Sb2), the process returns to step Sb1.

On the other hand, if the node-side control unit 25b determines that the accepted image includes the bright spot of the new guide light 51-1 (YES in step Sb2), the node-side control unit 25b acquires the usage status information from the node unit 29 via the alignment wiring 36. Based on the acquired usage status information and the drive history information stored in the internal storage area, the node-side control unit 25b determines whether any of the node-side telescopes 22-1 to 22-4 is in an idle state without performing communication (step Sb3).

If the node-side control unit 25b determines that none of the node-side telescopes 22-1 to 22-4 is in the idle state (NO in step Sb3), the process returns to step Sb1.

On the other hand, if the node-side control unit 25b determines that any of the node-side telescopes 22-1 to 22-4 is in the idle state (YES in step Sb3), the node-side control unit 25b allocates any one of the node-side telescopes 22-1 to 22-4 in the idle state to the station device 1-1 corresponding to the bright spot of the detected new guide light 51-1. Here, all of the node-side telescopes 22-1 to 22-4 are in the idle state as illustrated in FIG. 7. Thus, the node-side control unit 25b is assumed to allocate the node-side telescopes in order from the node-side telescope 22-1 having the lowest suffix number.

The node-side control unit 25b calculates the angle of turning and the angle of depression/elevation of the node-side telescope 22-1 based on the position of the bright spot of the new guide light 51-1 (step Sb5).

The node-side control unit 25b outputs a control signal including information of the calculated angle of turning and the angle of depression/elevation which is a control signal destined for the antenna drive unit 24-1 to the control wiring 31. The relay unit 27 receives the control signal for the node-side telescope 22-1 via the control wiring 31. Thus, the relay unit 27 outputs the control signal to the antenna drive unit 24-1 via the drive wiring 34-1 based on the destination included in the received control signal. The antenna drive unit 24-1 accepts the control signal via the drive wiring 34-1 and generates a drive signal based on the accepted control signal. The antenna drive unit 24-1 outputs the generated drive signal to the node-side base 23-1.

The node-side base 23-1 receives the drive signal from the antenna drive unit 24-1 to change the orientation of the node-side telescope 22-1 to have the angle of turning and the angle of depression/elevation indicated by the drive signal (step Sb6). That is, the node-side base 23-1 adjusts the orientation of the node-side telescope 22-1 to have the angle of turning and the angle of depression/elevation indicated by the drive signal.

As a result, the direction of orientation of the node-side telescope 22-1 faces the direction of orientation of the station-side telescope 11-1 coaxially or nearly coaxially.

The processes from step Sb1 are performed again. Next, at a time t2, it is assumed that there is a need for optical space communication between the node device 2b and the station device 1-2. In this case, the node-side telescopes 22-2, 22-3, and 22-4 are in the idle state. Thus, the node-side control unit 25b allocates the node-side telescope 22-2 in the next order to the station device 1-2 in the process of step Sb4. The node-side control unit 25b causes the direction of orientation of the node-side telescope 22-2 to face the direction of orientation of the station-side telescope 11-2 through the processes of steps Sb5 and Sb6.

Next, at a time t3, it is assumed that there is a need for optical space communication between the node device 2b and the station device 1-3. In this case, the node-side telescopes 22-3 and 22-4 are in the idle state. Thus, the node-side control unit 25b allocates the node-side telescope 22-3 in the next order to the station device 1-3 in the process of step Sb4. The node-side control unit 25b causes the direction of orientation of the node-side telescope 22-3 to face the direction of orientation of the station-side telescope 11-3 through the processes of steps Sb5 and Sb6.

Next, at a time t4, it is assumed that there is a need for optical space communication between the node device 2b and the station device 1-1 that has finished the optical space communication again. In this case, the node-side telescopes 22-1 and 22-4 are in the idle state. The node-side control unit 25b allocates the node-side telescope 22-4 in the next order to the station device 1-1 in the process of step Sb4. The node-side control unit 25b causes the direction of orientation of the node-side telescope 22-4 to face the direction of orientation of the station-side telescope 11-1 through the processes of steps Sb5 and Sb6.

Next, at a time t5, it is assumed that there is a need for optical space communication between the node device 2b and the station device 1-4. In this case, the node-side telescopes 22-1 and 22-2 are in the idle state. The node-side control unit 25b has completed allocation to the last node-side telescope 22-4. Thus, the node-side control unit 25b allocates the node-side telescope 22-1 having the lowest number to the station devices 1-4 again in the process of step Sb4. The node-side control unit 25b causes the direction of orientation of the node-side telescope 22-1 to face the direction of orientation of the station-side telescope 11-4 through the processes of steps Sb5 and Sb6.

In the configuration of the third embodiment described above, the node-side control unit 25b allocates any one of the node-side telescopes 22-1 to 22-4 that has not performed transmission and reception of optical signals to each of the station-side telescopes 11-1 to 11-4 corresponding to each of the guide light 51-1 to 51-4. This allocation is made based on the positions of each of the plurality of beams of the guide light 51-1 to 51-4 included in the image obtained by the camera 20 imaging the plurality of beams of the guide light 51-1 to 51-4 emitted by the guide light sources 12-1 to 12-4 of each of the plurality of station devices 1-1 to 1-4. In addition, the node-side control units 25b generates and outputs control signals for moving the node-side bases 23 supporting the allocated node-side telescopes 22-1 to 22-4 to cause the allocated node-side telescopes 22-1 to 22-4 face the station-side telescopes 11-1 to 11-4 corresponding to the node-side telescopes 22-1 to 22-4.

Thus, the node-side control unit 25b can allocate any one of the node-side telescopes 22-1 to 22-4 in the idle state to the station devices 1-1 to 1-4 that need to perform optical space communication without changing the direction of orientations of the node-side telescopes 22-1 to 22-4 that is performing optical space communication using the one camera 20. As a result, the communication status of the node-side telescopes 22-1 to 22-4 performing optical space communication can be maintained.

Further, although the node-side control unit 25b allocates the node-side telescopes 22-1 to 22-4 having the lowest suffix number of the reference numeral in order when the node-side telescopes 22-1 to 22-4 in the idle state are allocated in the configuration of the third embodiment described above, the configuration of the present invention is not limited to the embodiment. Any technique may be applied as long as it is a technique in which the node-side telescopes 22-1 to 22-4 can be allocated to the station devices 1-1 to 1-4 without overlapping.

For example, a sector that receives optical space communication is predetermined in each of the node-side telescopes 22-1 to 22-4. The node-side control unit 25b detects which sector has emitted the guide light 51-1 to 51-4 based on the positions of the bright spots of the guide light 51-1 to 51-4 included in the image captured by the camera 20. The node-side control unit 25b allocates the node-side telescopes 22-1 to 22-4 corresponding to the sector in order based on information indicating the detected sector. In addition, the node-side control unit 25b may allocate any of the node-side telescopes 22-1 to 22-4 corresponding to a neighbor sector if there is not any of the node-side telescopes 22-1 to 22-4 that can be allocated among the node-side telescopes 22-1 to 22-4 corresponding to a sector.

The node-side control unit 25b may increase priority of the allocation of the node-side telescopes 22-1 to 22-4 based on information indicating the positions of the station devices 1-1 to 1-4 or information indicating for example sectors at which the station devices 1-1 to 1-4 emitting the guide light 51-1 to 51-4 are positioned. The station devices 1-1 to 1-4 superimpose these pieces of information on the guide light 51-1 to 51-4. In addition, the node-side control unit 25b may allocate any of the node-side telescopes 22-1 to 22-4 fixed in advance for the important station devices 1-1 to 1-4.

In addition, the node-side control unit 25b may allocate, among the node-side telescopes 22-1 to 22-4 in the idle state, any of the node-side telescopes 22-1 to 22-4 in which a destination position indicated by the direction of orientation is the closest to the position of each of the station devices 1-1 to 1-4 serving as the illumination sources of the new guide light 51-1 to 51-4.

In addition, the node-side control unit 25b may allocate, among the node-side telescopes 22-1 to 22-4 in the idle state, any of the node-side telescopes 22-1 to 22-4 at the closest position to the position of the station devices 1-1 to 1-4 serving as illumination sources of the new guide light 51-1 to 51-4.

In addition, the above-described techniques of allocating the plurality of node-side telescopes 22-1 to 22-4 in the idle state may be combined.

In addition, although the node-side control unit 25b and the node unit 29 are connected by the alignment wiring 36 in the configuration of the third embodiment described above, a connection line 37 illustrated in FIG. 5 may be provided instead of the alignment wiring 36. In this case, the node-side control unit 25b acquires the usage status information from the node unit 29 through the node-side communication network 62 via the connection line 37. Although the connection line connecting the node unit 29 and the node-side communication network 62 is indicated by a dot-and-dash line indicating transmission of signal information, in this case, control information is also transmitted.

Figure 8:
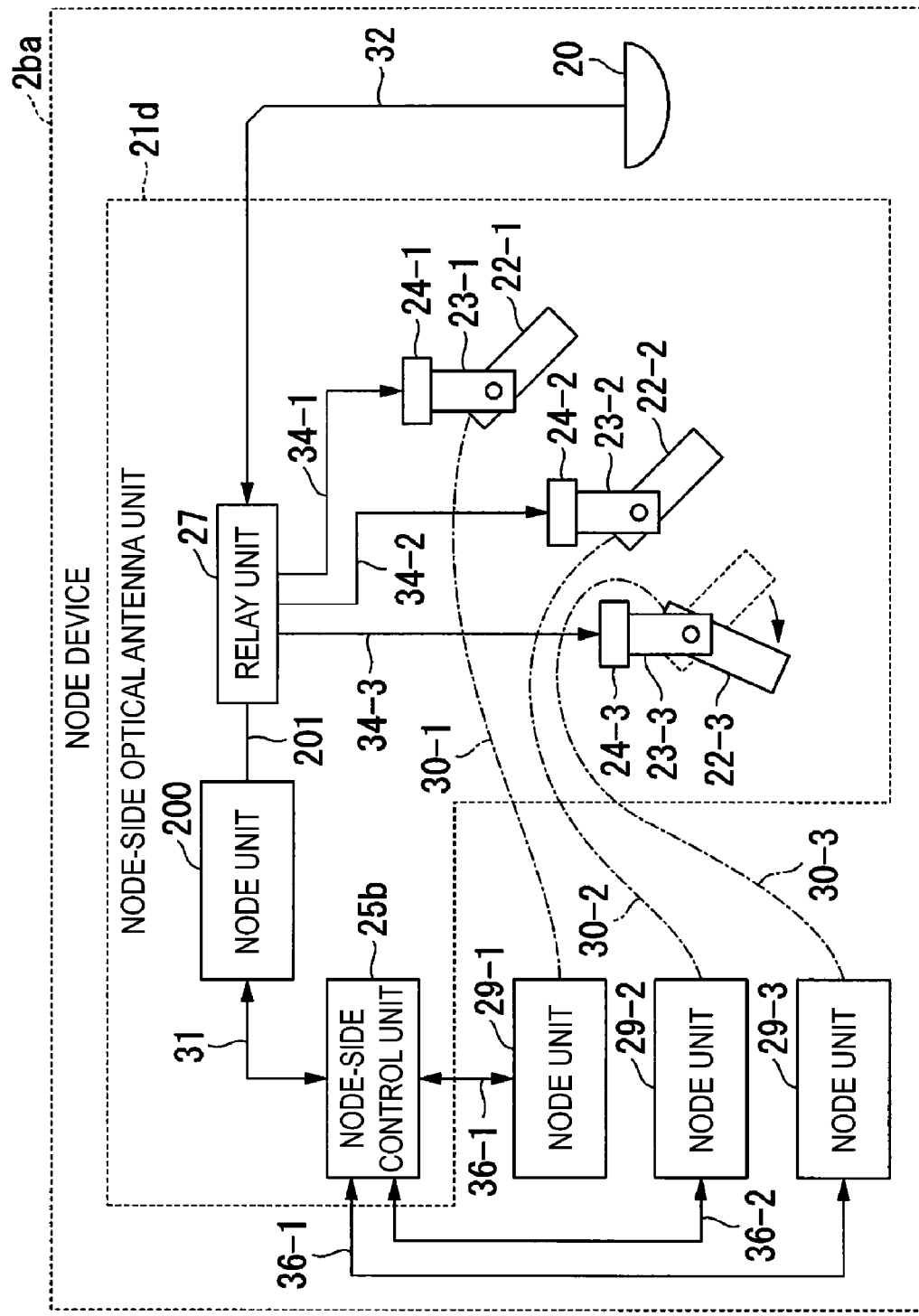
FIG. 8 is a diagram illustrating a modified configuration of the third embodiment (Example 1).

Further, in the third embodiment, although the plurality of station devices 1-1, 1-2, and 1-3 are accommodated in the passive optical network (PON) configuration in which the plurality of node-side telescopes 22-1, 22-2, and 22-3 are connected to the light splitter 70 by the optical fibers 30-1, 30-2, and 30-2, a configuration of the present invention is not limited to the embodiment. For example, a single star (SS) configuration in which a plurality of node units 29-1, 29-2, and 29-3 are disposed and the node-side telescopes 22-1, 22-2, and 22-3 are connected to node units 29-1, 29-2, and 29-3, respectively, using optical fibers 30-1, 30-2, and 30-2 as illustrated in FIG. 8 may be adopted. In this case, the node-side control unit 25b and each of the node units 29-1, 29-2, and 29-3 are connected by alignment wiring 36-1, 36-2, and 36-3, and the node-side control unit 25b acquires the usage status information from each of the node units 29-1, 29-2, and 29-3.

In addition, instead of the node-side control unit 25b acquiring the usage status information from each of the node units 29-1, 29-2, and 29-3 as illustrated in FIG. 8, the node-side control unit 25b may include another device to cause the other device to collect usage status information from each of the node units 29-1, 29-2, and 29-3 and to output collected usage status information to the node-side control unit 25b.

As illustrated in FIG. 8, a node unit 200 may be provided between the node-side control unit 25b and the relay unit 27, the node-side control unit 25b and the node unit 200 may be connected by control wiring 31, and the node unit 200 and the relay unit 27 may be connected by an optical fiber 201. Thus, the wiring between the node unit 200 and the relay unit 27 and between the node units 29-1, 29-2, and 29-3 and the node-side telescopes 22-1, 22-2, and 22-3 can be unified to optical wiring, that is, a wiring material called an optical fiber. As a result, a reduction in the cost required for the installation and maintenance of the wiring can be expected. In addition, in general, signal transmission methods using optical fibers can have a longer transmission distance than, for example, a signal transmission method using copper wires. Thus, compared to the configuration of the first embodiment, the configuration of FIG. 8 will be able to drive the node-side telescopes 22-1, 22-2, and 22-3 located in a farther distance. As a result, a wider area can be covered and a reduction in the costs required for coverage design and construction of the communication network can be expected.

Figure 9:
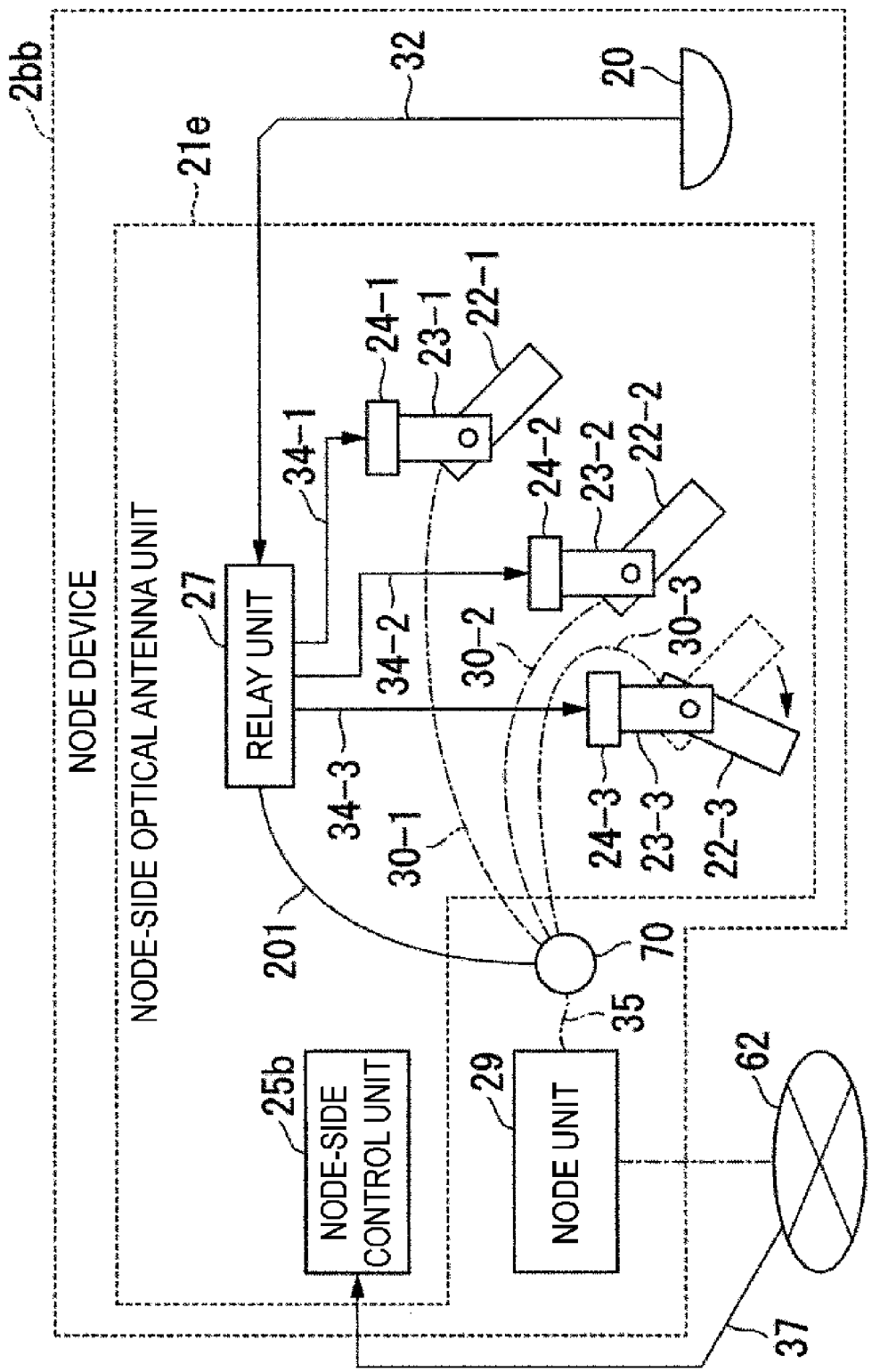
FIG. 9 is a diagram illustrating a modified configuration of the third embodiment (Example 2).

In a PON configuration, the relay unit 27 and the light splitter 70 may be connected by the optical fiber 201 without the node unit 200 as illustrated in FIG. 9. With the configuration of FIG. 9, the number of node units 29 can be reduced to have a single node unit 29, and the optical fiber corresponding to the distance between the node unit 29 and the light splitter 70 can be reduced to have a single optical fiber 35. As a result, the costs for the installation and maintenance can be further reduced than in the configuration illustrated in FIG. 8. Although the wiring of the optical fiber 35 and between the node unit 29 and the node-side communication network 62 is indicated by dot-and-dash lines for transmission of signal information, control information is also transmitted in this case.

Fourth Embodiment

Figure 10:
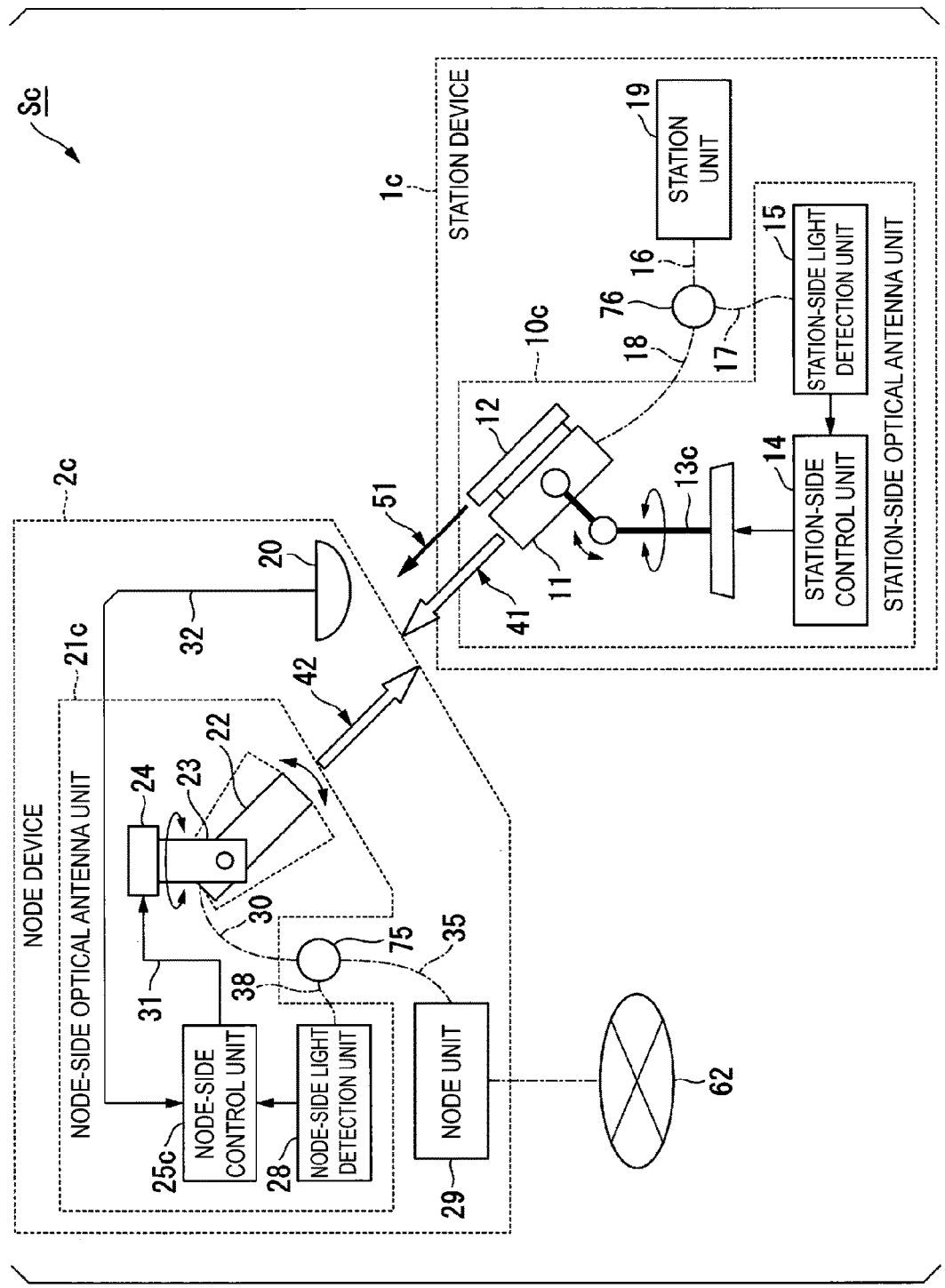
FIG. 10 is a block diagram illustrating a configuration of an optical space communication system according to a fourth embodiment.

FIG. 10 is a block diagram illustrating a configuration of an optical space communication system Sc according to a fourth embodiment. The same constituent components as those in the first to third embodiments are denoted by the same reference numerals, and different constituent components will be described.

In FIG. 10, the station-side communication network 61 is omitted. In fact, it is assumed that the station unit 19 is connected to the station-side communication network 61, as in the first embodiment.

The optical space communication system Sc includes a station device 1c and a node device 2c. The station device 1c includes a station-side optical antenna unit 10c, a station unit 19, and a light splitter 76.

The station-side optical antenna unit 10c includes a station-side telescope 11, a guide light source 12, a station-side base 13c, a station-side control unit 14, and a station-side light detection unit 15.

The light splitter 76 is a light divider and is connected to first ends of optical fibers 16, 17, and 18. The second end of the optical fiber 16 is connected to the station unit 19, the second end of the optical fiber 17 is connected to the station-side light detection unit 15, and the second end of the optical fiber 18 is connected to the station-side telescope 11. The light splitter 76 causes an optical signal emitted by the optical fiber 18 to be divided and makes the divided optical signals incident on the optical fiber 16 and the optical fiber 17. Further, an optical signal emitted by the optical fiber 16 is incident on the optical fiber 18.

The station-side base 13c supports the station-side telescope 11 to change a direction of orientation of the station-side telescope 11. Specifically, the station-side base 13c accepts an operation signal output by the station-side control unit 14 to adjust the direction of orientation of the station-side telescope 11 in accordance with the accepted operation signal.

The station-side light detection unit 15 receives an optical signal emitted by the optical fiber 17 and detects the light intensity value of the received optical signal. The station-side light detection unit 15 outputs the detected light intensity value to the station-side control unit 14.

The station-side control unit 14 accepts the light intensity value output by the station-side light detection unit 15 and analyzes a temporal change in the accepted light intensity value. The station-side control unit 14 generates an operation signal for moving the station-side telescope 11 slightly to detect the direction of orientation of the station-side telescope 11 in which the light intensity value has a maximum value, and outputs the generated operation signal to the station-side base 13c.

The node device 2c includes a camera 20, a node-side optical antenna unit 21c, a node unit 29, and a light splitter 75.

The light splitter 75 is a light divider and is connected to first ends of optical fibers 30, 35, and 38. The second end of the optical fiber 30 is connected to a node-side telescope 22, the second end of the optical fiber 35 is connected to the node unit 29, and the second end of the optical fiber 38 is connected to a node-side light detection unit 28. The light splitter 75 causes an optical signal emitted by the optical fiber 30 to be divided and makes the divided optical signals incident on the optical fiber 35 and the optical fiber 38. An optical signal emitted by the optical fiber 35 is incident on the optical fiber 30.

The node-side optical antenna unit 21c includes the node-side telescope 22, a node-side base 23, an antenna drive unit 24, a node-side control unit 25c, and the node-side light detection unit 28.

The node-side light detection unit 28 receives an optical signal emitted by the optical fiber 38 and detects the light intensity value of the received optical signal. The node-side light detection unit 28 outputs the detected light intensity value to the node-side control unit 25c.

In addition to the configuration in which the node-side control unit 25 of the first embodiment is included, the node-side control unit 25c has the following configuration. Specifically, the node-side control unit 25c accepts a light intensity value output by the node-side light detection unit 28. The node-side control unit 25c generates a control signal for causing the node-side telescope 22 to move slightly to detect the direction of orientation of the node-side telescope 22 in which the light intensity value has a maximum value, and outputs the generated control signal to the antenna drive unit 24. The node-side control unit 25c analyzes a temporal change in the light intensity value obtained by slightly moving the node-side telescope 22 and calculates the angle of turning and angle of depression/elevation of the node-side telescope 22 at which the light intensity value has a maximum value.

Figure 11:
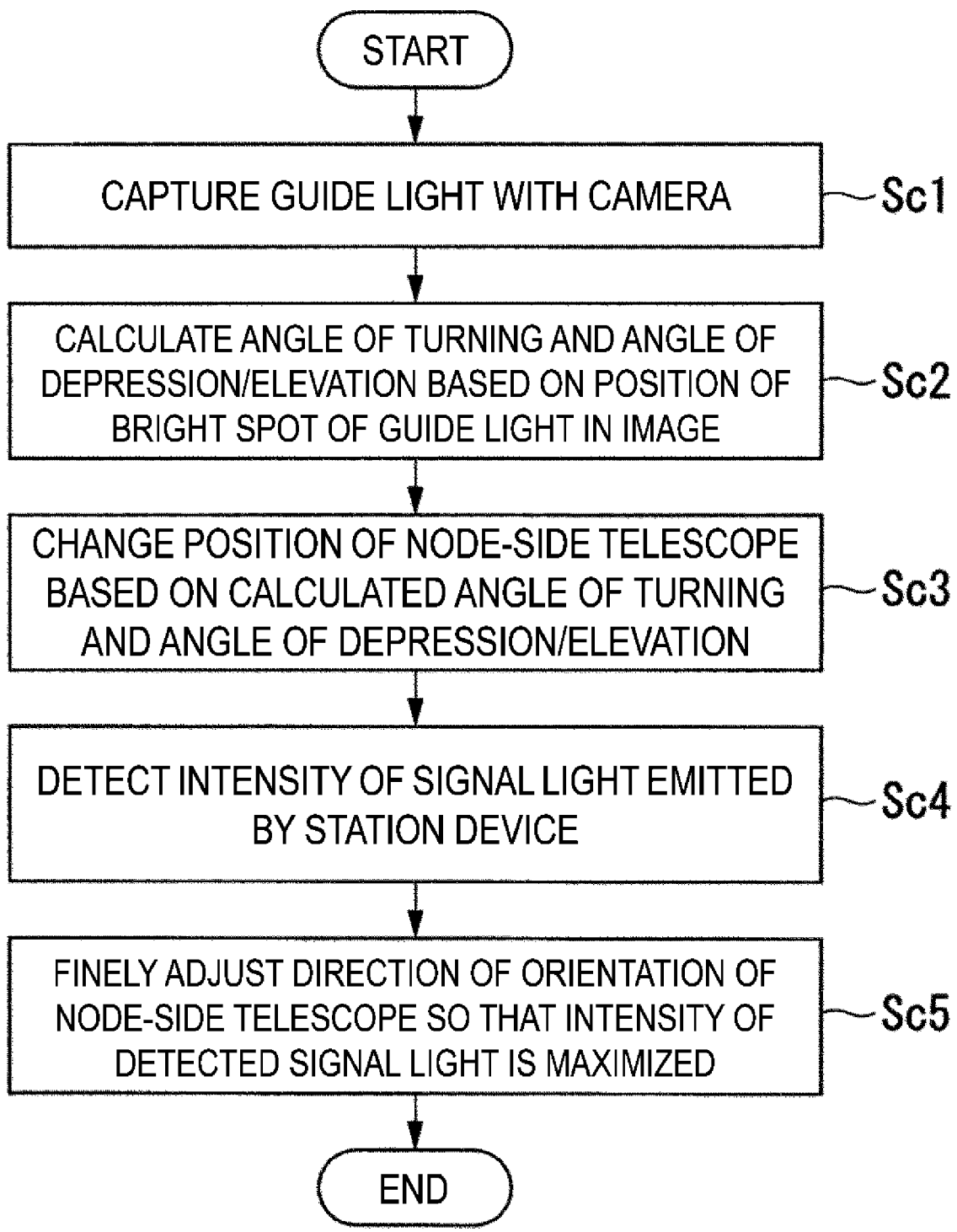
FIG. 11 is a flowchart illustrating a process performed by a node-side optical antenna unit according to the fourth embodiment.

Process of Node Device in Optical Space Communication System of Fourth Embodiment FIG. 11 is a flowchart illustrating a process performed by the node-side optical antenna unit 21c of the node device 2c according to the fourth embodiment. The node-side optical antenna unit 21c performs the processes from step Sc1 to step Sc3, similar to step S1 to step S3 in the first embodiment.

At the time point at which step Sc3 ends, the direction of orientation of the station-side telescope 11 faces the direction of orientation of the node-side telescope 22 coaxially or nearly coaxially. In the case in which the directions are nearly coaxial, a light intensity of optical signals received by the station-side telescope 11 and the node-side telescope 22 can be increased through further fine adjustment.

The node-side light detection unit 28 receives an optical signal emitted by the optical fiber 38, which is a part of the optical signal that has been divided by the light splitter 75. The node-side light detection unit 28 detects the light intensity value of the received optical signal (step Sc4).

The node-side light detection unit 28 outputs the detected light intensity value to the node-side control unit 25c. The node-side control unit 25c accepts the light intensity value output by the node-side light detection unit 28.

The node-side control unit 25c finely adjusts the direction of orientation of the node-side telescope 22 to detect the direction of orientation of the node-side telescope 22 in which the light intensity value has a maximum value (step Sc5). For example, the node-side control unit 25c generates a control signal for moving the node-side telescope 22 slightly, and outputs the generated control signal to the antenna drive unit 24.

The antenna drive unit 24 generates a drive signal for moving the node-side telescope 22 slightly based on the control signal output by the node-side control unit 25c, and outputs the generated drive signal to the node-side base 23. The node-side base 23 receives the drive signal output by the antenna drive unit 24 to move the node-side telescope 22 slightly in one or both directions in which the angle of turning and the angle of depression/elevation increase and decrease, for example, from the position of the node-side telescope 22 at the time point at which the drive signal has been received.

The node-side control unit 25c sequentially accepts the light intensity values output by the node-side light detection unit 28, and analyzes a temporal change in the light intensity values. From the analysis results, the node-side control unit 25c calculates the direction of orientation of the node-side telescope 22, i.e., the angle of turning and the angle of depression/elevation, in which the light intensity value has a maximum value. The node-side control unit 25c outputs a control signal including information of the calculated angle of turning and the angle of depression/elevation to the antenna drive unit 24.

The antenna drive unit 24 generates a drive signal based on the control signal output by the node-side control unit 25c, and outputs the generated drive signal to the node-side base 23. The node-side base 23 receives the drive signal output by the antenna drive unit 24 to change the direction of orientation of the node-side telescope 22 to the direction of orientation in which the light intensity value has a maximum value.

Figure 12:
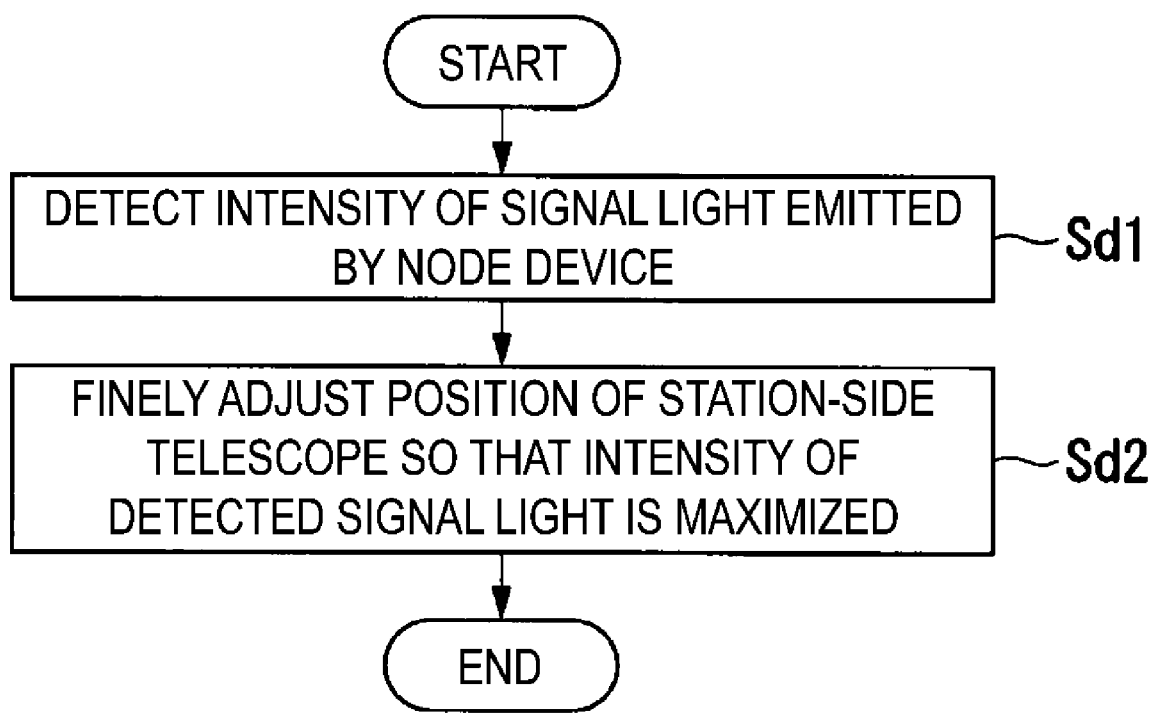
FIG. 12 is a flowchart illustrating a process performed by a station-side optical antenna unit according to the fourth embodiment.

Process of Station Device in Optical Space Communication System of Fourth Embodiment FIG. 12 is a flowchart illustrating a process of the station-side optical antenna unit 10c of the station device 1c according to the fourth embodiment. At the time point at which step Sc3 of the flowchart illustrated in FIG. 11 ends, the direction of orientation of the station-side telescope 11 faces the direction of orientation of the node-side telescope 22 coaxially or nearly coaxially, as described above.

The station-side light detection unit 15 receives an optical signal emitted by the optical fiber 17, which is a part of the optical signal that has been divided by the light splitter 76. The station-side light detection unit 15 detects the light intensity value of the received optical signal (step Sd1).

The station-side light detection unit 15 outputs the detected light intensity value to the station-side control unit 14. The station-side control unit 14 accepts the light intensity value output by the station-side light detection unit 15.

The station-side control unit 14 finely adjusts the direction of orientation of the station-side telescope 11 to detect the direction of orientation of the station-side telescope 11 in which the light intensity value has a maximum value (step Sd2). For example, the station-side control unit 14 generates an operation signal for moving the station-side telescope 11 slightly, and outputs the generated operation signal to the station-side base 13c.

The station-side base 13c receives the operation signal output by the station-side control unit 14 to move the station-side telescope 11 slightly in one or both directions in which the angle of turning and the angle of depression/elevation increases and decreases, for example, from the position of station-side telescope 11 at the time point at which the operation signal has been received.

The station-side control unit 14 sequentially accepts the light intensity values output by the station-side light detection unit 15 and analyzes a temporal change in the accepted light intensity values. From the analysis results, the station-side control unit 14 calculates the direction of orientation of the station-side telescope 11, i.e., the angle of turning and the angle of depression/elevation, in which the light intensity value has a maximum value. The station-side control unit 14 outputs an operation signal including information of the calculated angle of turning and angle of depression/elevation to the station-side base 13*c*.

The station-side base 13*c* receives the operation signal output by the station-side control unit 14 to change the direction of orientation of the station-side telescope 11 to the direction of orientation in which the light intensity value has a maximum value.

Further, although the node-side telescope 22 and the station-side telescope 11 are finely adjusted so that the light intensity values have the maximum values, respectively, in the configuration of the fourth embodiment described above, the configuration of the present invention is not limited to the embodiment described above. For example, a part of the band used for optical communication is allocated as a control band, the node-side control unit 25*c* is connected to the node unit 29, and the station-side control unit 14 is connected to the station unit 19. Furthermore, the node-side control unit 25*c* and the station-side control unit 14 may use a control band so that the node-side control unit 25*c* and the station-side control unit 14 perform fine adjustment to have each light intensity value at the maximum value while exchanging information on the temporal changes in the light intensity values for the units.

In addition, it may be configured that the station-side control unit 14 is connected to the guide light source 12 to allow the station-side control unit 14 to modulate the guide light 51 emitted by the guide light source 12 so as to superimpose the information on the temporal change in the light intensity value of the station device 1*c* side on the guide light 51 and to notify the node device 2*c* of the information. In this case, the node-side control unit 25*c* demodulates the guide light 51 captured by the camera 20 to acquire the information of the temporal change in the light intensity value of the station device 1*c* side.

Another Configuration Example of Fourth Embodiment

In the configuration of the fourth embodiment described above, the station-side telescope 11 and the node-side telescope 22 are moved slightly to detect the direction of orientation in which the light intensity value has the maximum value. Meanwhile, a direction of orientation in which a light intensity value has a maximum value may be detected with the configurations described below.

Another Configuration Example of Fourth Embodiment (Example 1)

Figure 13:
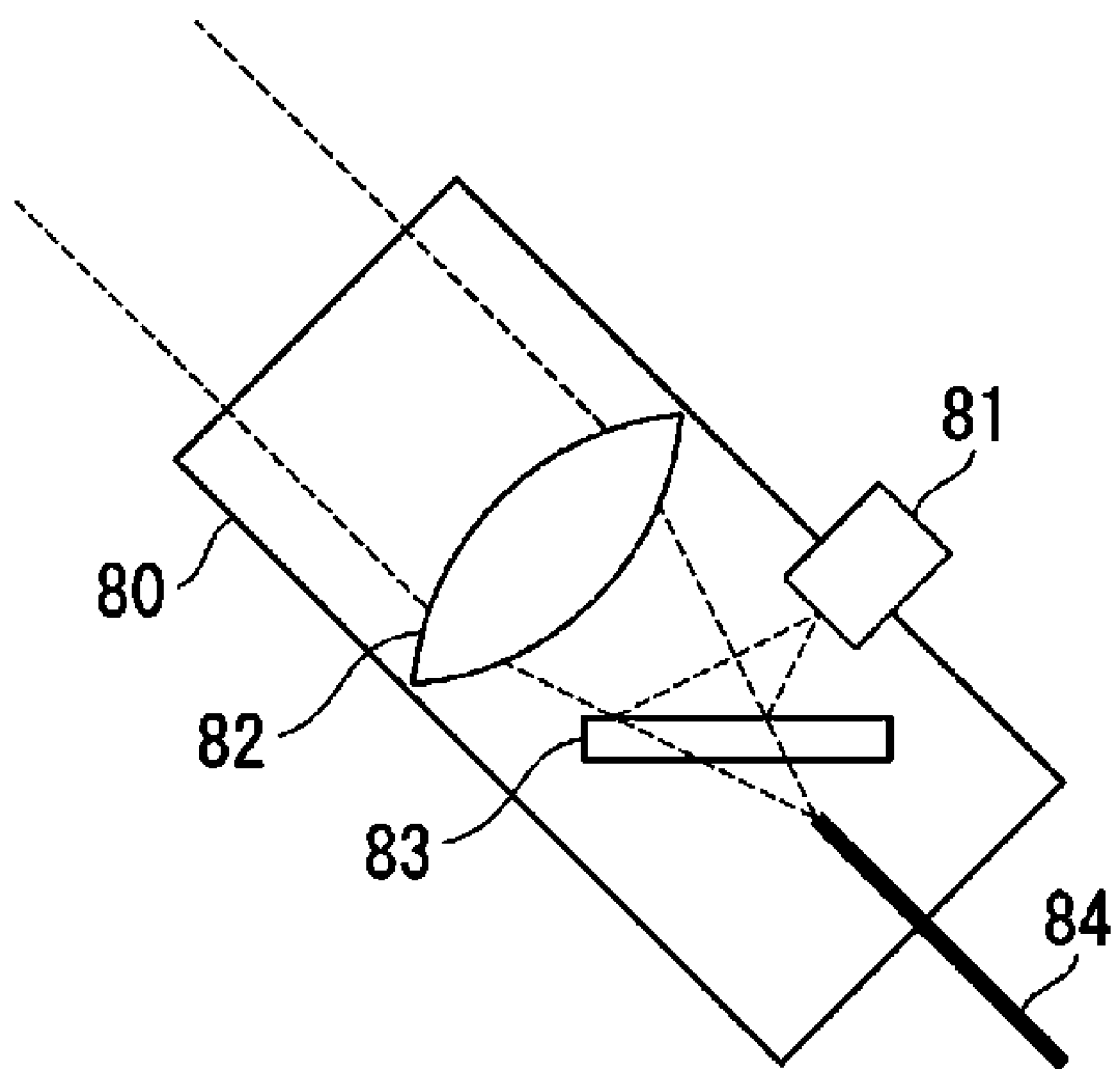
FIG. 13 is a diagram illustrating another configuration example of a station-side telescope and a node-side telescope according to the fourth embodiment (Example 1).

FIG. 13 is a diagram illustrating an internal configuration of the station-side telescope 11 and the node-side telescope 22. A lens barrel 80 corresponds to those of the station-side telescope 11 and the node-side telescope 22. A lens 82 and a spatial light coupler 83 are provided inside the lens barrel 80, and an additional guide light transmitter/receiver 81 is mounted to the lens barrel 80, and an optical fiber 84 is inserted into the lens barrel 80.

The lens 82 represents a group of aggregated optical elements inside the lens barrel 80, and is not limited to the convex shape illustrated in FIG. 13, and may be a lens in another shape. The optical fiber 84 corresponds to the optical fiber 18 and the optical fiber 30 in FIG. 10 and emits an optical signal.

The additional guide light transmitter/receiver 81 emits additional guide light perpendicular to the longitudinal direction of the lens barrel 80. The additional guide light is, for example, laser light illustrating similar straightness to that of light of the optical signal (hereinafter referred to as "signal light") emitted by the optical fiber 84. A wavelength different from the signal light is applied as a wavelength of the additional guide light. The additional guide light transmitter/receiver 81 is connected to the station-side control unit 14 when it is inserted into the station-side telescope 11, and is connected to the node-side control unit 25*c* when it is inserted into the node-side telescope 22.

The spatial light coupler 83 is, for example, a beam splitter such as a half mirror, and is installed to tilt at 45 degrees with respect to the longitudinal direction of the lens barrel 80 as illustrated in FIG. 13. An optical element applied to the spatial light coupler 83 is a wavelength-dependent optical element which can clearly separate the wavelength of the additional guide light from the wavelength of signal light.

In this way, on the illumination side, signal light passes through the spatial light coupler 83 and travels straight. The additional guide light is reflected by the spatial light coupler 83 with the optical axis changed by 90 degrees to be coaxial with the optical axis of the signal light, and then reaches the opposing station-side telescope 11 or node-side telescope 22.

In contrast, on the light receiving side, the additional guide light is separated from the signal light by the spatial light coupler 83 with the optical axis changed by 90 degrees, and then reaches the additional guide light transmitter/receiver 81. The signal light passes through the spatial light coupler 83 and travels straight.

The additional guide light transmitter/receiver 81 on the light receiving side of the additional guide light receives the additional guide light separated by the spatial light coupler 83, and detects the light intensity value of the received additional guide light.

In addition, in this configuration example, the node unit 29 is connected to the optical fiber 30 without passing through the light splitter 75. For this reason, the node unit 29 is directly connected to the node-side telescope 22 via the optical fiber 30. In addition, the station unit 19 is connected to the optical fiber 18 without passing through the light splitter 76. For this reason, the station unit 19 is directly connected to the station-side telescope 11 via the optical fiber 18. In addition, there is no need to include the node-side light detection unit 28 and the station-side light detection unit 15 in the configuration example, because the additional guide light transmitter/receiver 81 detects the light intensity value.

The node-side control unit 25*c* performs the processes of steps Sc4 and Sc5 illustrated in FIG. 11 based on the light intensity values output by the additional guide light transmitter/receiver 81 inserted into the node-side telescope 22. In addition, the station-side control unit 14 performs the processes of steps Sd1 and Sd2 illustrated in FIG. 12 based on the light intensity values output by the additional guide light transmitter/receiver 81 inserted into the station-side telescope 11.

As a result, similar to the optical space communication system Sc of the fourth embodiment, the direction of orientation of the node-side telescope 22 is caused to face the direction of orientation of the station-side telescope 11 according to the technique described in the first embodiment, then fine adjustment can be further performed using additional guide light, and thus the node-side telescope 22 and the station-side telescope 11 can be caused to face the direction of orientation in which the light intensity value has a maximum value.

As described above, the wavelength of the additional guide light is a wavelength different from that of the signal light, and the optical element applied to the spatial light coupler 83 clearly separates the wavelength of the additional guide light and the wavelength of the signal light. As a result, even if additional guide light is being emitted while optical space communication is being performed, the directions of orientation of the station-side telescope 11 and the node-side telescope 22 can be finely adjusted during the optical space communication, without interfering with the optical space communication.

Further, a removable reflecting mirror may be applied, instead of the spatial light coupler 83. In other words, the reflecting mirror is inserted while the process to determine the direction of orientation of the station-side telescope 11 and the node-side telescope 22 is performed, and the reflecting mirror is removed after the process to determining the direction of orientation is completed. In the case of the reflecting mirror, optical space communication cannot be performed while it is inserted into the optical path of signal light, and thus there is no interference between additional guide light and the signal light. Therefore, a wavelength of the additional guide light can be selected as desired. In this case, it is necessary to notify the opposing node-side control unit 25c or station-side control unit 14 of the fact that the process to determine the direction of orientation of the station-side telescope 11 and the node-side telescope 22 has been completed. Thus, the notification may be made by superimposing a signal indicating that the additional guide light has been finely adjusted and transmitting the signal to the opposing side, or may be made using another technique such as causing the additional guide light or guide light emitted by the guide light source 12 to blink.

Figure 14:
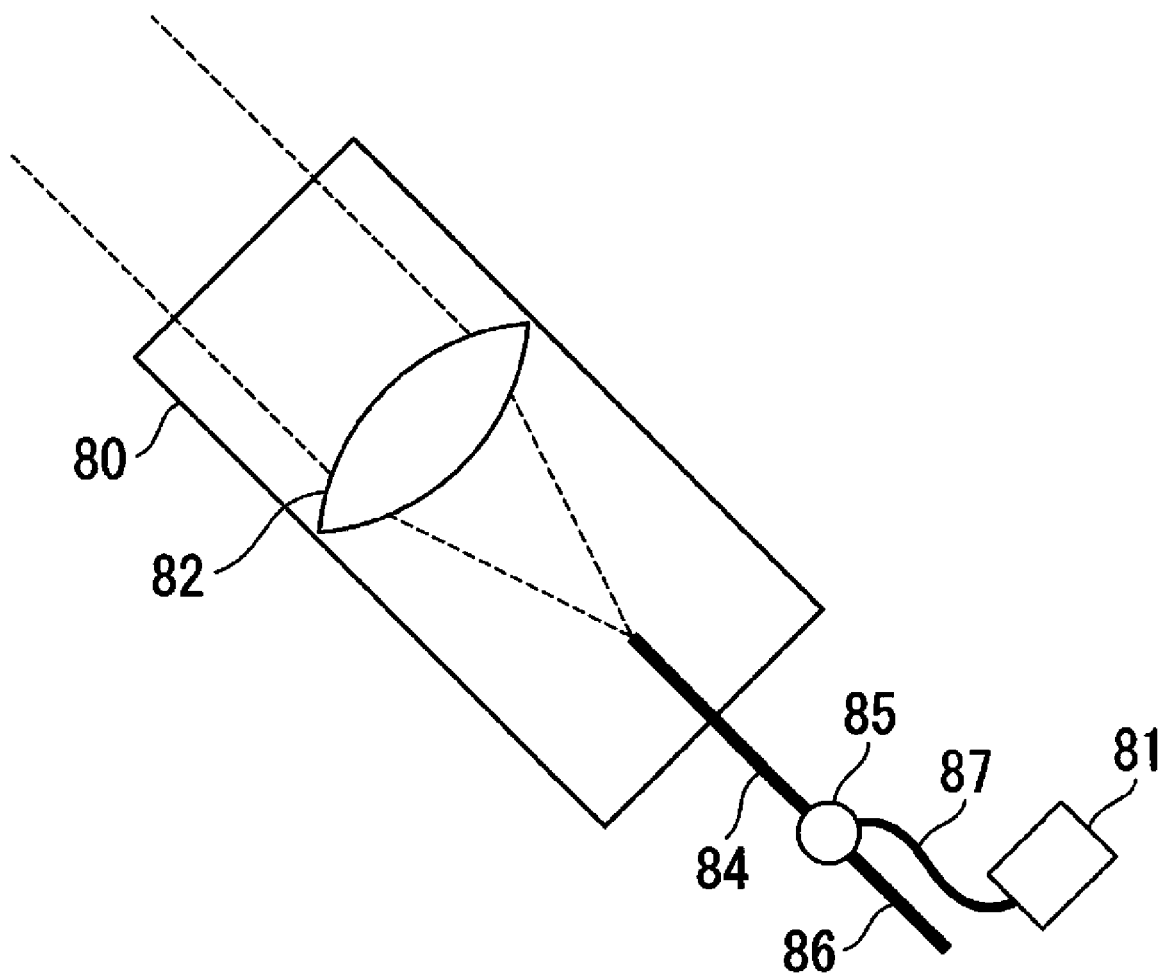
FIG. 14 is a diagram illustrating a modified configuration of the other configuration example of the fourth embodiment (Example 1).

In addition, rather than adopting the configuration in which the spatial light coupler 83 illustrated in FIG. 13 is provided inside the lens barrel 80, a light splitter 85 and an optical fiber 86 for signal light may be connected to the optical fiber 84 and the additional guide light transmitter/receiver 81 may be connected to an optical fiber 87 as illustrated in FIG. 14. The light splitter 85 is a light divider which causes an optical signal emitted by the optical fiber 84 to be divided and makes the divided optical signals incident on the optical fiber 86 and the optical fiber 87. Further, the optical signal emitted by the optical fiber 86 is incident on the optical fiber 84.

In the case of the configuration illustrated in FIG. 14, the light splitter 85 is set as a wavelength-dependent optical element capable of separating additional guide light from signal light, and the wavelength of the additional guide light needs to be a wavelength different from that of the signal light. As a result, fine adjustment can be made during optical space communication.

Another Configuration Example of Fourth Embodiment (Example 2)

Figure 15:
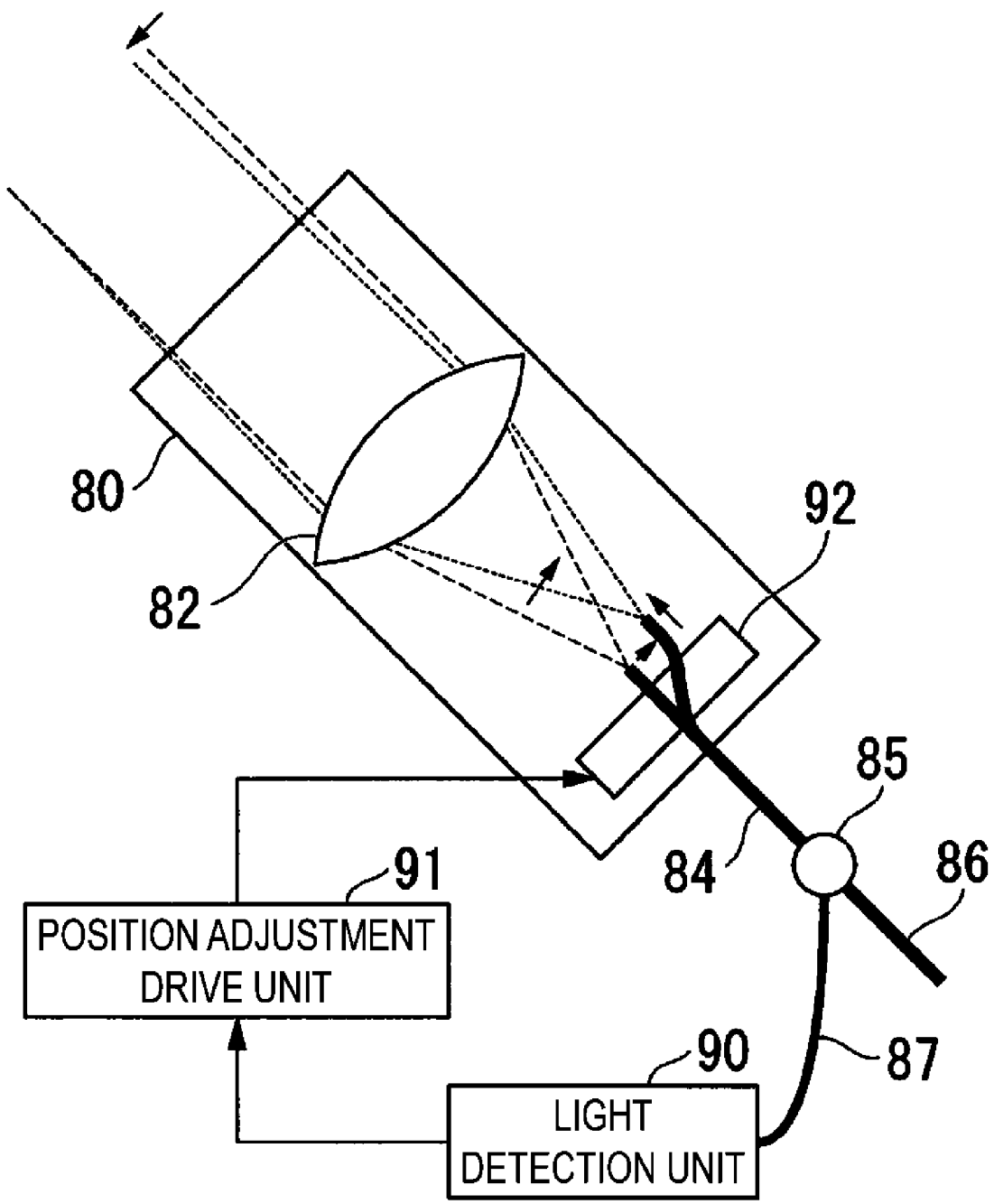
FIG. 15 is a diagram illustrating another configuration example of the station-side telescope and the node-side telescope according to the fourth embodiment (Example 2).

FIG. 15 is a diagram illustrating an internal configuration of the station-side telescope 11 and the node-side telescope 22. The same configurations as those of FIGS. 13 and 14 are denoted by the same reference numerals, and different configurations will be described below.

A lens 82 and an emission position adjustment unit 92 are provided inside a lens barrel 80. The emission position adjustment unit 92 receives a scanning signal and moves the end face of the optical fiber 84, that is, the emission position of the optical signal, in a direction parallel to the opening surface of the lens barrel 80, or in the longitudinal direction of the lens barrel 80. As a result, the optical path of the optical signal is changed as illustrated in FIG. 15, which enables the direction of orientation to be changed.

A light detection unit 90 is a functional unit having the same configuration as the station-side light detection unit 15 and the node-side light detection unit 28 illustrated in FIG. 10, and branches out by the light splitter 85 and detects the light intensity value of an optical signal received via an optical fiber 87.

A position adjustment drive unit 91 accepts light intensity values output by the light detection unit 90 and analyzes a temporal change in the accepted light intensity values. The position adjustment drive unit 91 generates a scanning signal for moving a position of the optical fiber 84 slightly and outputs the generated scanning signal to the emission position adjustment unit 92 to detect the direction of orientation in which the light intensity value has a maximum value. In other words, the position adjustment drive unit 91 is a functional unit that performs a process corresponding to the process of fine adjustment performed by the station-side control unit 14 and the node-side control unit 25c according to the fourth embodiment. In other words, if the position adjustment drive unit 91 is provided in the station device 1c, it is provided in place of the station-side control unit 14. In addition, if the position adjustment drive unit 91 is provided in the node device 2c, it is provided to be integrated with the node-side control unit 25 of the first embodiment in place of the node-side control unit 25c.

In the case in which the position adjustment drive unit 91 is provided in the node device 2c, the position adjustment drive unit 91 performs the processes of steps Sc4 and Sc5 illustrated in FIG. 11 based on the light intensity value detected by the light detection unit 90. In addition, in the case in which the position adjustment drive unit 91 is provided in the station device 1c, the position adjustment drive unit 91 performs the processes of steps Sd1 and Sd2 illustrated in FIG. 12 based on the light intensity value detected by the light detection unit 90.

In steps Sc5 and Sd2, the position adjustment drive unit 91 outputs a scanning signal to the emission position adjustment unit 92 and scans the optical fiber 84 in the following manner. In other words, the position adjustment drive unit 91 accepts the light intensity value output by the light detection unit 90 while moving the emission position of the optical fiber 84 slightly. The position adjustment drive unit 91 analyzes a temporal change in light intensity values and detects the emission position of the optical fiber 84 at which the light intensity value has a maximum value. In addition, in a case in which a threshold value for the light intensity value at the time of reception of an optical signal is predetermined and the light intensity value is lower than the threshold value, the position adjustment drive unit 91 may start outputting the scanning signal to finely adjust the emission position of the optical fiber 84.

As a result, similar to the optical space communication system Sc of the fourth embodiment, the direction of orientation of the station-side telescope 11 is caused to face the direction of orientation of the node-side telescope 22 according to the technique described in the first embodiment, then fine adjustment can be further performed by moving the emission position of the optical fiber 84 slightly. This enables the station-side telescope 11 and the node-side telescope 22 to face in the direction of orientation in which the light intensity value has the maximum value. In addition, because the light intensity of the received optical signal is measured in the configuration illustrated in FIG. 15, it is possible to perform fine adjustment even during optical space communication.

Figure 16:
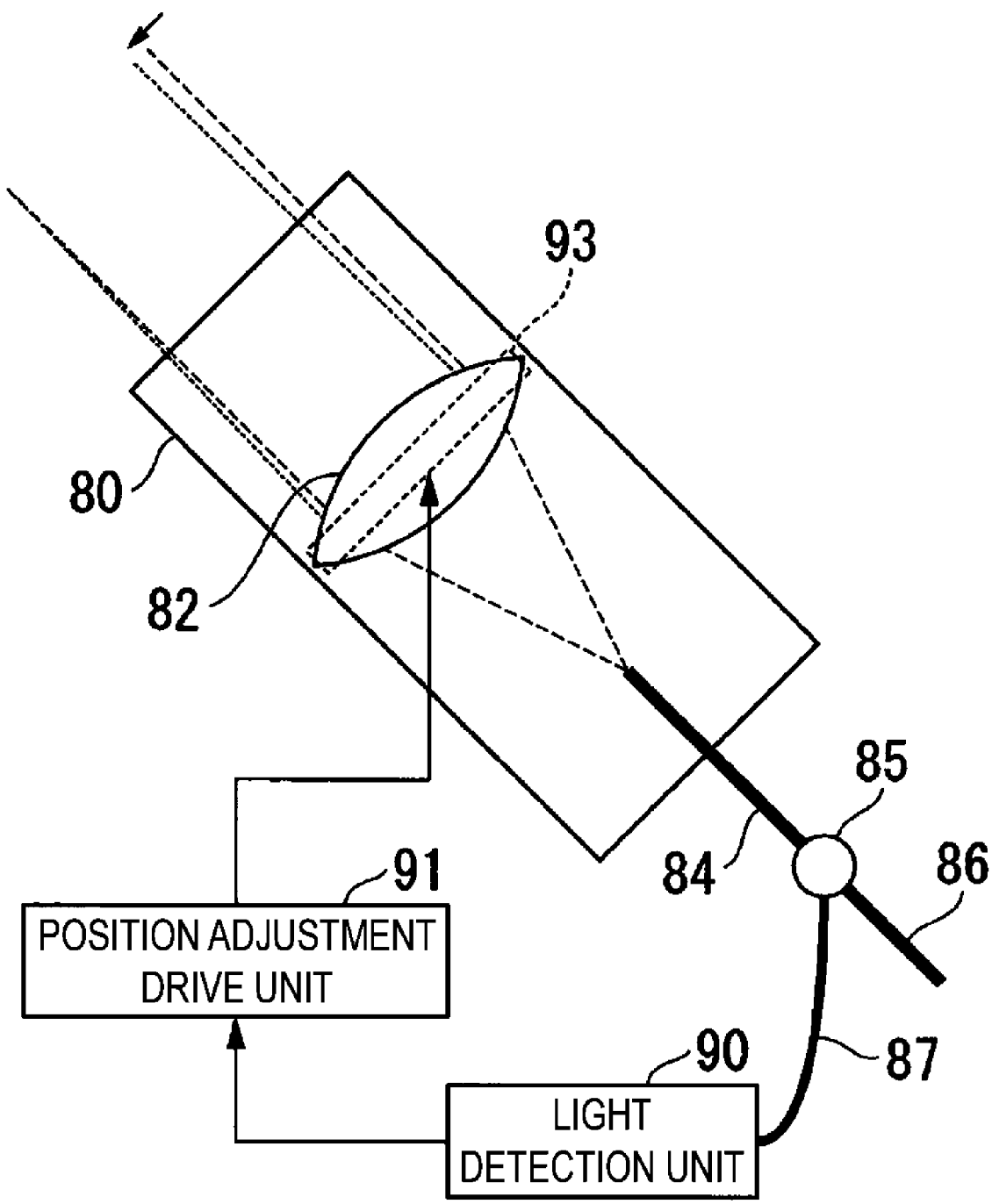
FIG. 16 is a diagram illustrating a modified configuration example of the other configuration example of the fourth embodiment (Example 2).

Further, a lens position adjustment unit 93 that moves a position of the lens 82 may be provided as illustrated in FIG. 16, in place of the emission position adjustment unit 92. In this case, the optical path of the optical signal is changed by changing a position of the lens 82 as illustrated in FIG. 16, the direction of orientation can be changed, and as a result, the same effects as in the configuration illustrated in FIG. 15 can be obtained.

For example, a piezoelectric element or a micro machine can be applied as the lens position adjustment unit 93. The piezoelectric element and micro machine cause the group of optical elements such as prisms and lenses that constitute the station-side telescope 11 and the node-side telescope 22 to move slightly, and thus the optical axis of an optical signal can be moved slightly. In addition, the optical axes of the station-side telescope 11 and the node-side telescope 22 may be moved slightly with an optical element that changes the optical path using an electric field or magnetic field applied from outside, such as KTP crystal or LiNbO crystal, regardless of mechanical techniques.

Further, in the configuration of the fourth embodiment and the other configuration examples of the fourth embodiment described above, the expected change in light intensity values, a speed of reaction required for that change, and a required light intensity are assumed to be determined as appropriate in each of the configurations. In addition, an algorithm for maximizing the light intensity value in the station-side control unit 14 and the node-side control unit 25c is also assumed to be appropriately determined.

In the configuration of the fourth embodiment and the other configuration examples of the fourth embodiment described above, the node-side control unit 25c outputs a control signal for adjusting the direction of orientation of the node-side telescope 22 so that the direction of orientation of the node-side telescope 22 faces the direction of orientation of the station-side telescope 11 based on a light intensity value indicating the intensity of light received by the node-side telescope 22. In addition, the station device 1c includes the station-side base 13c that supports the station-side telescope 11 and receives an operation signal to change a direction of orientation of the station-side telescope 11. In the station device 1c, the station-side control unit 14 outputs an operation signal for adjusting the direction of orientation of the station-side telescope 11 so that the direction of orientation of the node-side telescope 22 faces the direction of orientation of the station-side telescope 11 based on a light intensity value indicating an intensity of light received by the station-side telescope 11. This may maximize the light intensity of the optical signals received by the station-side telescope 11 and the node-side telescope 22. As a result, optical signals can be received with more efficiency, making it possible to utilize more light in optical space communication and to perform more stable optical space communication.

Further, in the configuration of the fourth embodiment and the other configuration examples of the fourth embodiment described above, the direction of orientation may be finely adjusted for both the node-side telescope 22 and the station-side telescope 11, or the direction of orientation may be finely adjusted for only one of the telescopes.

Fifth Embodiment

Figure 17A:
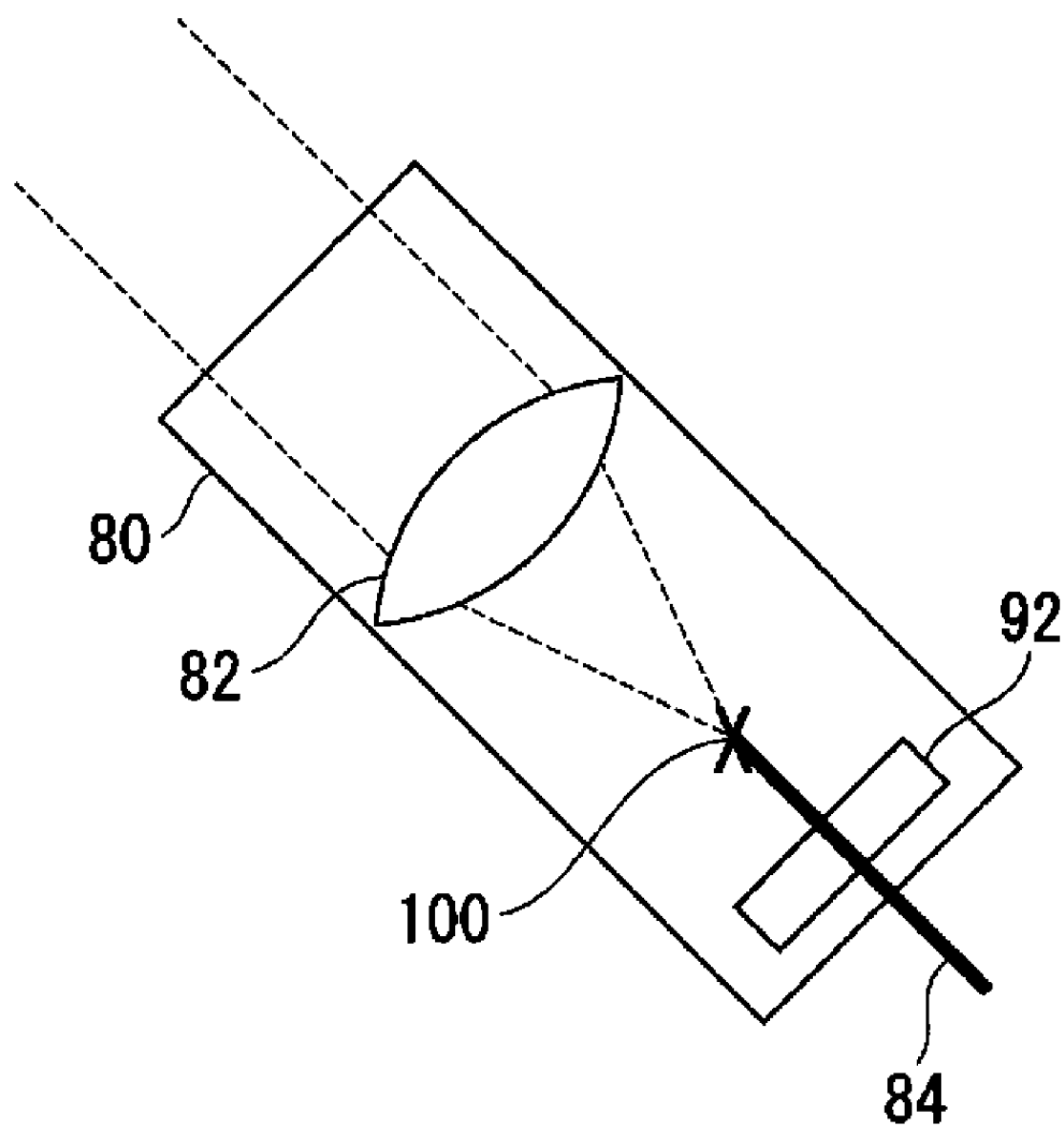
FIG. 17A is a diagram illustrating a configuration of a station-side telescope according to a fifth embodiment.
Figure 17B:
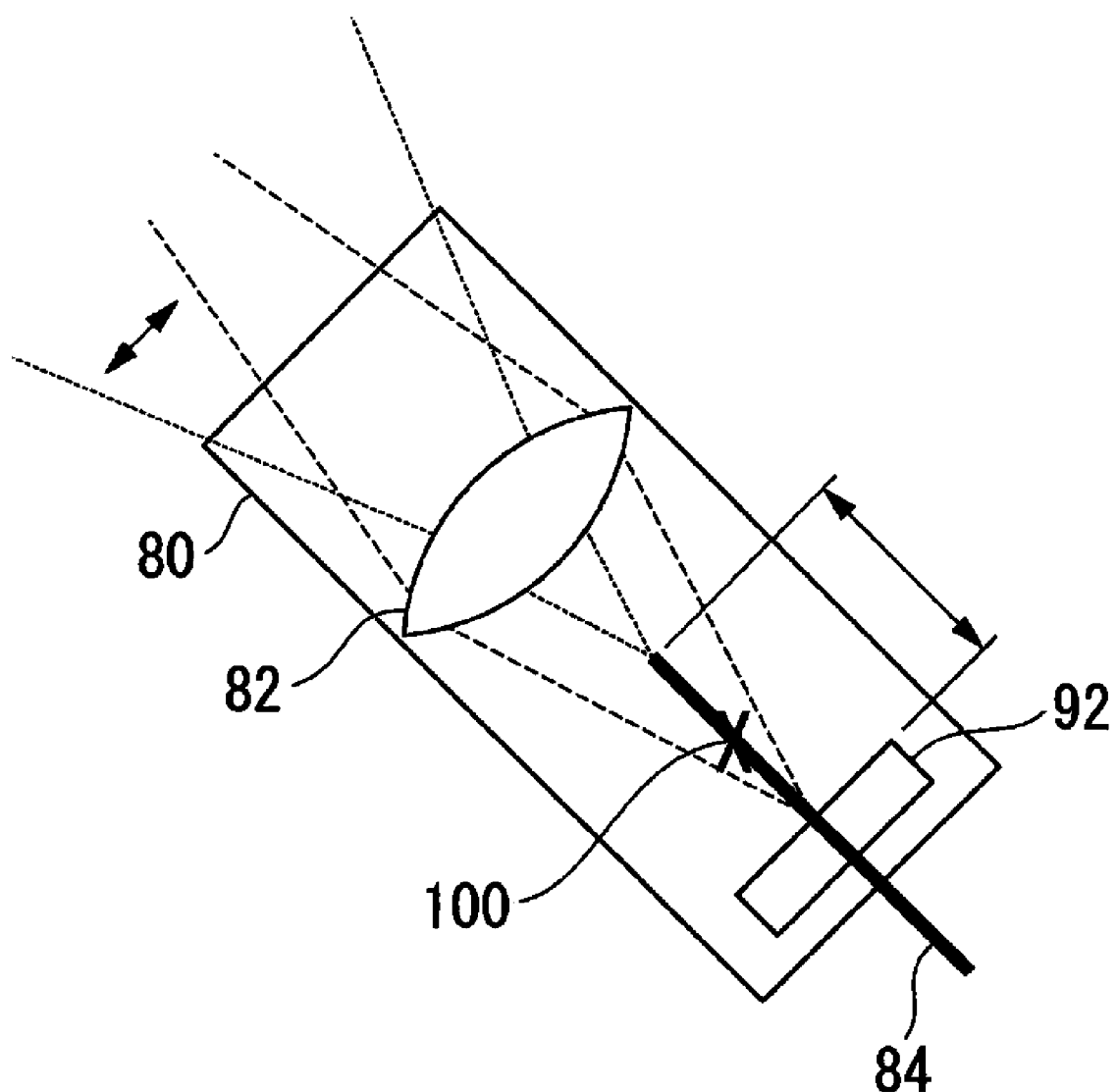
FIG. 17B is a diagram illustrating a configuration of a node-side telescope according to the fifth embodiment.

FIG. 17A is a diagram illustrating an internal configuration of a station-side telescope 11 and a node-side telescope 22 according to a fifth embodiment. FIG. 17B is a diagram illustrating an internal configuration of the node-side telescope 22 according to the fifth embodiment. The same configurations as those of FIGS. 13 to 16 are denoted by the same reference numerals, and different configurations will be described below. A lens barrel 80 corresponds to those of the station-side telescope 11 and the node-side telescope 22. A lens 82 and an optical fiber position adjustment unit 92 into which an optical fiber 84 is inserted are provided inside the lens barrel 80.

Here, for example, when the lens barrel 80 is assumed to be applied to the station-side telescope 11 and the node-side telescope 22 of the optical space communication system Sc of the fourth embodiment, and the optical space communication system Sc to which the lens barrel 80 is applied will be referred to as an optical space communication system Sd for convenience of description.

In a case in which the lens barrel 80 is applied to the node-side telescope 22, the optical fiber position adjustment unit 92 receives a scanning signal from the node-side control unit 25c to move a position of the end face of the optical fiber 84 backward and forward from the position of a focal point 100 of the lens 82 in parallel to the longitudinal direction of the lens barrel 80. In addition, in a case in which the lens barrel 80 is applied to the station-side telescope 11, the optical fiber position adjustment unit 92 receives a scanning signal from the station-side control unit 14 to move a position of the end face of the optical fiber 84 backward and forward from the position of the focal point 100 of the lens 82 in parallel to the longitudinal direction of the lens barrel 80.

FIG. 17A is a diagram of a case in which the end face of the optical fiber 84 is located at the focal point of the lens 82, and in this case, the optical path indicated by the dashed line forms a parallel beam with a substantially constant cross-section. Thus, when signal light is received at the opposing node-side telescope 22 or station-side telescope 11, light is condensed at the position of the focal point 100 or substantially at the position of the focal point 100. As a result, the light intensity of the received signal light becomes strong, and thus it is possible to perform stable optical space communication.

Meanwhile, FIG. 17B is a diagram of a case in which the end face of the optical fiber 84 is moved from the focal point 100. In FIG. 17B, the dotted optical path indicates an optical path of a case in which the end face of the optical fiber 84 is moved to a position closer to the lens 82 than to the focal point of the lens 82, and the dashed optical path indicates an optical path of a case in which the end face of the optical fiber 84 is moved to a position farther from the focal point of the lens 82.

As illustrated in FIG. 17B, the beam of the signal light on the dotted optical path is not parallel but diffuses gradually.

In contrast, the beam of signal light on the dashed optical path is not parallel, but converges gradually, and is concentrated in the space on the way.

When the beam of signal light diffuses, the signal light is easily received at the opposing node-side telescope 22 or station-side telescope 11. Conversely, when the beam of signal light converges, the signal light is received with difficulty at the opposing node-side telescope 22 or station-side telescope 11, but instead, by appropriately adjusting the position of the optical fiber 84 to condense light on the opposing side, signal light can be received with an increased light intensity and good efficiency.

Thus, for example, the beam of signal light is diffused to facilitate capturing of the signal light until the process of step Sc3 illustrated in FIG. 11, and the signal light is converged in the processes of steps Sc4 and Sc5 of FIG. 11 after the signal light is captured and the processes of fine adjustment in steps Sd1 and Sd2 of FIG. 12, and thus optical space communication can be started more quickly and more efficiently.

Further, a position of the lens 82 may be changed in the longitudinal direction of the lens barrel 80, or a position of the lens 82 may be changed in the longitudinal direction of the lens barrel 80, and at the same time, a position of the end face of the optical fiber 84 may be changed.

In the configuration of the fifth embodiment described above, the station device 1*c* diffuses or converges the beam of optical signals emitted by the station-side telescope 11. In addition, the node device 2*c* diffuses or converges the beam of optical signals emitted by the node-side telescope 22. This allows the thicknesses of the light beam 42 emitted by the node-side telescope 22 and the light beam 41 emitted by the station-side telescope 11 to be varied, and thus optical space communication can be started more quickly and more efficiently.

In addition, the configuration of the relay unit 27 and the optical fiber 201 as illustrated in FIGS. 8 and 9 may be applied to the first, second, fourth, and fifth embodiments and the other configuration examples of the fourth embodiment described above to cover a wider area.

In addition, although, in the configurations of the first to fifth embodiments and the other configuration examples of the fourth embodiment, the optical space communication systems S, Sa, Sb, Sc, and Sd have a configuration without the station-side communication network 61 and the node-side communication network 62, the systems may have a configuration including the station-side communication network 61 and the node-side communication network 62.

In addition, the configurations of the first to fifth embodiments and the other configuration examples of the fourth embodiment described above may be combined with each other.

In each of the above embodiments, the node-side control units 25, 25*a*, 25*b*, and 25*c* may be configured to perform the process of the node unit 29. When the configuration described above is adopted, the node devices 2, 2*a*, 2*b*, 2*ba*, 2*bb*, and 2*c* may not include the node unit 29.

The node-side control units 25, 25*a*, 25*b*, and 25*c*, the station-side control unit 14, and the position adjustment drive unit 91 in the aforementioned embodiments may be implemented by computers. In such a case, it may be implemented by recording a program for implementing these functions in a computer-readable recording medium, causing a computer system to read the program recorded in the recording medium, and executing the program. Note that the "computer system" as used herein includes an OS and hardware such as a peripheral device. In addition, the "computer-readable recording medium" refers to a portable medium such as a flexible disk, a magneto-optical disk, a read only memory (ROM), and a compact disk read only memory (CD-ROM), and a storage device such as a hard disk built into a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is a volatile memory inside a computer system that functions as a server or a client in the above-described case. In addition, the above program may be a program for implementing a part of the above-mentioned functions, may further be a program capable of implementing the above-mentioned functions in combination with another program already recorded in a computer system, and may be implemented with the use of a programmable logic device such as a field programmable gate array (FPGA).

Although the embodiments of the present invention have been described above in detail with reference to the drawings, specific configurations are not limited to those embodiments, and any design or the like within the scope not departing from the gist of the present invention is also included therein.

REFERENCE SIGNS LIST

1 Station device
2 Node device
10 Station-side optical antenna unit
11 Station-side telescope
12 Guide light source
13 Station-side base
18 Optical fiber
19 Station unit
20 Camera
21 Node-side optical antenna unit
22 Node-side telescope
23 Node-side base
24 Antenna drive unit
25 Node-side control unit
29 Node unit
30 Optical fiber
41, 42 Light beam
51 Guide light
61 Station-side communication network
62 Node-side communication network
S Optical space communication system

The invention claimed is:

1. An optical space communication system comprising:
a station device including a station-side optical antenna unit; and
a node device including a node-side optical antenna unit and a camera, the optical space communication system being configured to perform optical space communication between the station device and the node device,
wherein the station-side optical antenna unit includes:
a station-side telescope configured to transmit and receive an optical signal, and
a guide light source configured to emit guide light in a direction of orientation of the station-side telescope,
wherein the node-side optical antenna unit includes:
a node-side telescope configured to transmit and receive the optical signal, a node-side control unit, implemented using one or more computing devices, configured to generate and output a control signal for moving a node-side base based on a position of the guide light included in an image obtained by the camera capturing the guide light emitted by the guide light source so that a direction of orientation of the node-side telescope faces the direction of orientation of the station-side telescope, an antenna drive unit, implemented using one or more computing devices, configured to receive the control signal and generate and output a drive signal based on the control signal, and the node-side base configured to support the node-side telescope and receive the drive signal to change the direction of orientation of the node-side telescope, wherein the station device is provided in plurality, wherein the node device includes a plurality of the node-side telescopes, a plurality of the node-side bases corresponding to the plurality of the node-side telescopes, and a plurality of the antenna drive units corresponding to the plurality of the node-side bases, and wherein the node-side control unit is configured to:
allocate, based on a position of an individual beam of a plurality of beams of the guide light included in the image obtained by the camera capturing the plurality of beams of the guide light emitted by the guide light sources of the plurality of the station devices, any one of the plurality of the node-side telescopes that is performing neither transmission nor reception of the optical signal to one of the station-side telescopes corresponding to the individual beam of the plurality of beams of the guide light, and generate and output the control signal for moving one of the plurality of the node-side bases supporting the allocated node-side telescope so that the allocated node-side telescope faces the station-side telescope corresponding to the node-side telescope.

2. The optical space communication system according to claim 1,
wherein the node-side optical antenna unit includes a directional camera configured to capture an image in the direction of orientation of the node-side telescope, and
wherein the node-side control unit is configured to generate and output the control signal for moving the node-side base based on a position of the guide light included in the image captured by the directional camera so that the direction of orientation of the node-side telescope faces the direction of orientation of the station-side telescope.

3. The optical space communication system according to claim 1,
wherein the node-side control unit is configured to output the control signal that adjusts the direction of orientation of the node-side telescope based on a light intensity value indicating an intensity of light received by the node-side telescope so that the direction of orientation of the node-side telescope faces the direction of orientation of the station-side telescope, or
wherein the station device includes:
a station-side base configured to support the station-side telescope and receive an operation signal to change the direction of orientation of the station-side telescope, and a station-side control unit, implemented using one or more computing devices, configured to output the operation signal for adjusting the direction of orientation of the station-side telescope based on a light intensity value indicating an intensity of light received by the station-side telescope so that the direction of orientation of the node-side telescope faces the direction of orientation of the station-side telescope.

4. The optical space communication system according to claim 3,
wherein the node-side control unit is configured to, when the node-side control unit is configured to adjust the direction of orientation of the node-side telescope, output the control signal that adjusts the direction of orientation of the node-side telescope by changing the orientation of the node-side telescope, an emission position of light within the node-side telescope or a position of a lens included in the node-side telescope, or
wherein the station-side control unit is configured to, when the station-side control unit is configured to adjust the direction of orientation of the station-side telescope, output the operation signal that adjusts the direction of orientation of the station-side telescope by changing the orientation of the station-side telescope, an emission position of light within the station-side telescope or a position of a lens included in the station-side telescope.

5. The optical space communication system according to claim 3,
wherein the node-side control unit is configured to operate as follows:
when the node-side control unit adjusts the direction of orientation of the node-side telescope, the light received by the node-side telescope includes signal light and additional guide light, and the node-side control unit outputs the control signal for adjusting the direction of orientation of the node-side telescope based on the light intensity value of the additional guide light so that the direction of orientation of the node-side telescope faces the direction of orientation of the station-side telescope, or
when the station-side control unit adjusts the direction of orientation of the station-side telescope, the light received by the station-side telescope includes the signal light and the additional guide light, and the station-side control unit outputs the operation signal for adjusting the direction of orientation of the station-side telescope based on the light intensity value of the additional guide light so that the direction of orientation of the node-side telescope faces the direction of orientation of the station-side telescope.

6. The optical space communication system according to claim 1,
wherein the node device is configured to diffuse or converge a beam of the optical signal emitted by the node-side telescope, or
wherein the station device is configured to diffuse or converge a beam of the optical signal emitted by the station-side telescope.

7. An optical space communication method performed by an optical space communication system comprising (i) a station device including a station-side optical antenna unit and (ii) a node device including a node-side optical antenna unit and a camera, the optical space communication method performing optical space communication between the station device and the node device, the optical space communication method comprising:
- by a station-side telescope included in the station-side optical antenna unit, transmitting and receiving an optical signal;
- by a guide light source included in the station-side optical antenna unit, emitting guide light in a direction of orientation of the station-side telescope;
- by a node-side telescope included in the node-side optical antenna unit, transmitting and receiving an optical signal;
- by a node-side control unit implemented using one or more computing devices and included in the node-side optical antenna unit, generating and outputting a control signal for moving a node-side base based on a position of the guide light included in an image obtained by the camera capturing the guide light emitted by the guide light source so that a direction of orientation of the node-side telescope faces the direction of orientation of the station-side telescope;
- by an antenna drive unit implemented using one or more computing devices, receiving the control signal and generating and outputting a drive signal based on the control signal and
- by the node-side base included in the node-side optical antenna unit, supporting the node-side telescope and receiving the drive signal to change the direction of orientation of the node-side telescope, wherein the station device is provided in plurality, wherein the node device includes a plurality of the node-side telescopes, a plurality of the node-side bases corresponding to the plurality of the node-side telescopes, and a plurality of the antenna drive units corresponding to the plurality of the node-side bases, and wherein the optical space communication method further comprises:
- by the node-side control unit, allocating, based on a position of an individual beam of a plurality of beams of the guide light included in the image obtained by the camera capturing the plurality of beams of the guide light emitted by the guide light sources of the plurality of the station devices, any one of the plurality of the node-side telescopes that is performing neither transmission nor reception of the optical signal to one of the station-side telescopes corresponding to the individual beam of the plurality of beams of the guide light; and
- by the node-side control unit, generating and outputting the control signal for moving one of the plurality of the node-side bases supporting the allocated node-side telescope so that the allocated node-side telescope faces the station-side telescope corresponding to the node-side telescope.

* * * * *